(12) United States Patent
Mahalingam et al.

(10) Patent No.: US 12,273,839 B2
(45) Date of Patent: *Apr. 8, 2025

(54) TIMING ADVANCE FOR NON-TERRESTRIAL NETWORK COMMUNICATION

(71) Applicant: INTERDIGITAL PATENT HOLDINGS, INC., Wilmington, DE (US)

(72) Inventors: Nagi Mahalingam, San Diego, CA (US); Anantharaman Balasubramanian, San Diego, CA (US); Mihaela Beluri, Jericho, NY (US); Ravikumar V. Pragada, Warrington, PA (US); Mahmoud Taherzadeh Boroujeni, San Diego, CA (US); Shahrokh Nayeb Nazar, San Diego, CA (US); Seyed Mohsen Hosseinian, San Diego, CA (US); Frank La Sita, Long Beach, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/770,114

(22) Filed: Jul. 11, 2024

(65) Prior Publication Data
US 2024/0365268 A1 Oct. 31, 2024

Related U.S. Application Data

(63) Continuation of application No. 17/044,586, filed as application No. PCT/US2019/025628 on Apr. 3, 2019.

(Continued)

(51) Int. Cl.
H04W 56/00 (2009.01)
H04B 7/185 (2006.01)
(Continued)

(52) U.S. Cl.
CPC .... H04W 56/0045 (2013.01); H04B 7/18513 (2013.01); H04W 56/0005 (2013.01); H04W 74/0833 (2013.01)

(58) Field of Classification Search
CPC ......... H04W 56/0045; H04W 56/0005; H04W 74/0833; H04B 7/18513
See application file for complete search history.

(56) References Cited

U.S. PATENT DOCUMENTS 9,363,778 B2 6/2016 Haartsen et al.
9,559,768 B2 1/2017 Dent
(Continued)

OTHER PUBLICATIONS

De Gaudenzi et al., "Enhanced spread Aloha physical layer design and performance,", International Journal of Satellite Communications and Networking, vol. 32, No. 6 (2014).
(Continued)

Primary Examiner — Bailor C Hsu
(74) Attorney, Agent, or Firm — VOLPE KOENIG

(57) ABSTRACT

Methods, systems, and devices for addressing timing advance (TA) in non-terrestrial network communication is disclosed herein. A wireless transmit and receive unit (WTRU) may receive system information from a base station attached to an airborne or spaceborne vehicle that indicates a physical random access channel (PRACH) resource. The WTRU may determine a timing offset based on a plurality of information, such as the location information and the system information. The WTRU may transmit a preamble using the timing offset via the PRACH resource. The base station may receive the preamble and send a random access response (RAR) that includes, for example, (Continued)

a TA command. The WTRU may receive the RAR including the TA command and combine the timing offset with the TA command to determine an actual TA, after which the WTRU may use the actual TA for uplink transmissions.

12 Claims, 27 Drawing Sheets

Related U.S. Application Data

(60) Provisional application No. 62/652,698, filed on Apr. 4, 2018, provisional application No. 62/652,182, filed on Apr. 3, 2018.

(51) Int. Cl.
*H04W 74/08* (2024.01)
*H04W 74/0833* (2024.01)

(56) References Cited

U.S. PATENT DOCUMENTS

| | | | |
|---|---|---|---|
| 11,800,479 B2* | 10/2023 | Leng | H04B 7/1851 |
| 11,856,631 B1 | 12/2023 | Huang et al. | |
| 2007/0021122 A1 | 1/2007 | Lane et al. | |
| 2008/0020702 A1 | 1/2008 | Jendbro et al. | |
| 2008/0182579 A1 | 7/2008 | Wang et al. | |
| 2009/0238126 A1 | 9/2009 | Sato et al. | |
| 2009/0303122 A1 | 12/2009 | Weng | |
| 2010/0066599 A1 | 3/2010 | Liu et al. | |
| 2010/0109943 A1 | 5/2010 | Park et al. | |
| 2010/0117899 A1 | 5/2010 | Papadimitratos et al. | |
| 2011/0223932 A1 | 9/2011 | Hole et al. | |
| 2013/0058315 A1 | 3/2013 | Feuersanger et al. | |
| 2013/0215874 A1 | 8/2013 | Yang et al. | |
| 2013/0315136 A1 | 11/2013 | Bhaskar et al. | |
| 2014/0044108 A1 | 2/2014 | Earnshaw et al. | |
| 2015/0070211 A1 | 3/2015 | Cheng et al. | |
| 2017/0302368 A1 | 10/2017 | Trott | |
| 2018/0006710 A1 | 1/2018 | Buer et al. | |
| 2018/0210090 A1 | 7/2018 | Soualle et al. | |
| 2019/0141754 A1 | 5/2019 | Bai et al. | |
| 2019/0342000 A1 | 11/2019 | Zheng et al. | |
| 2019/0349077 A1 | 11/2019 | Alasti et al. | |
| 2021/0105761 A1 | 4/2021 | Cheng et al. | |
| 2021/0136641 A1 | 5/2021 | Roy et al. | |
| 2021/0273719 A1 | 9/2021 | Wang et al. | |
| 2021/0321464 A1* | 10/2021 | Lin | H04B 7/1851 |
| 2021/0337598 A1 | 10/2021 | Ma et al. | |
| 2021/0345274 A1* | 11/2021 | Yuan | H04W 56/0015 |
| 2022/0086780 A1* | 3/2022 | Tsai | G01S 19/05 |
| 2022/0086786 A1 | 3/2022 | Narasimha et al. | |
| 2022/0124834 A1* | 4/2022 | Jeong | H04W 74/0841 |
| 2022/0216896 A1 | 7/2022 | Speidel | |
| 2022/0232503 A1* | 7/2022 | Cheng | H04W 56/0045 |
| 2023/0037533 A1* | 2/2023 | Huang | H04W 28/06 |
| 2023/0049998 A1* | 2/2023 | Li | H04W 56/0045 |
| 2023/0131305 A1* | 4/2023 | Cozzo | H04W 72/0446 370/329 |
| 2023/0269685 A1* | 8/2023 | Park | H04W 56/0005 370/350 |
| 2023/0362741 A1* | 11/2023 | Li | H04W 36/0016 |
| 2023/0413203 A1* | 12/2023 | Ryu | H04W 74/0833 |
| 2024/0064677 A1* | 2/2024 | Yan | H04W 56/0035 |
| 2024/0155447 A1* | 5/2024 | Wigard | H04W 36/362 |
| 2024/0235664 A1* | 7/2024 | Ji | H04W 36/0072 |

OTHER PUBLICATIONS

Department of Transportation, Global Positioning System (GPS) Civil Monitoring Performance Specification, GPS Civil Monitoring Performance Specification, DOT-VNTSC-FAA-09-08 (Apr. 30, 2009).

Dish Network et al., "Satellite Aspects—Forward Compatibility Consideration," 3GPP TSG RAN WG1 Meeting #86 bis, R1-1609781, Busan (Oct. 10-15, 2016).

Ericsson, "On Random Access for NTN," 3GPP TSG-RAN WG2 #104, R2-1817765, Spokane, US (Nov. 12-16, 2018).

gps.gov, Global Positioning System Precise Positioning Service Performance Standard, $1^{st}$ edition (Feb. 2007).

gps.gov, Global Positioning System Standard Positioning Service Performance Standard, $4^{th}$ edition (Sep. 2008).

gps.gov, Global Positioning System Wide Area Augmentation System (WAAS) Performance Standard, $1^{st}$ edition (Oct. 2008).

IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

Interdigital Inc. et al., "Considerations on Timing Advance for NTN," 3GPP TSG RAN WG1 Meeting #92bis, R1-1804858, Sanya, China (Apr. 16-20, 2018).

International Telecommunication Union, "Series G: Transmission Systems and Media, Digital Systems and Networks; Digital networks—Quality and availability targets; The control of jitter and wander within digital networks which are based on the 2048 kbit/s hierarchy," ITU-T Recommendation G.823 (Mar. 2000).

Moudrak, "Validation of Galileo Timing Services," DLR Institute of Communications and Navigation (Dec. 2005).

Nokia, "Way Forward on Two-Step RACH Procedure," 3GPP TSG RAN WG1 #87, R1-1613548, Reno, Nevada, USA (Nov. 14-18, 2016).

Nomor Research Gmbh et al., "Initial Random Access Procedure in Non-Terrestrial Networks (NTN)," 3GPP TSG-RAN WG2 Meeting # 104, R2-1818510, Spokane, US (Nov. 12-16, 2018).

physicsinsights.org, "A Simple Description of the Sagnac Effect" available at http://www.physicsinsights.org/sagnac_1.html (2007).

Thales, "NR-NTN: Impact on Initial TA during random access procedure," 3GPP TSG RAN1 Meeting #92-Bis, R1-1805095, Sanya, China (Apr. 16-20, 2018).

Thales, "Propagation delay and Doppler in Non-Terrestrial Networks," 3GPP TSG RAN Meeting 76, RP-170982, West Palm Beach, USA (Jun. 5-9, 2017).

Thales, "Study on solutions evaluation for NR to support Non-Terrestrial Network," 3GPP TSG RAN meeting #80, RP-181370, La Jolla, USA (Jun. 11-14, 2018).

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.1.0 (Mar. 2018).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.4.0 (Dec. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.1.0 (Mar. 2018).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.1.0 (Mar. 2018).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.4.0 (Dec. 2018).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network NR Radio Resource Control (RRC) protocol specification (Release 15)," 3GPP TS 38.331 V15.4.0 (Dec. 2018).
Third Generation Partnership Project, "Technical Specification Group Radio Access Network; Study on New Radio (NR) to support non terrestrial networks (Release 15)," 3GPP TR 38.811 V15.0.0 (Jun. 2018).
Third Generation Partnership Project, "Technical Specification Group Radio Access Network; Study on New Radio (NR) to support non terrestrial networks (Release 15)," 3GPP TR 38.811 V0.3.0 (Dec. 2017).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; NR; Medium Access Control (MAC) protocol specification (Release 15)," 3GPP TS 38.321 V15.0.0 (Dec. 2017).
Third Generation Partnership Project, "Technical Specification Group Radio Access Network; Solutions for NR to support non-terrestrial networks (NTN) (Release 16)," 3GPP TR 38.821 V0.3.0 (Nov. 2018).
Third Generation Partnership Project, "Technical Specification Group Radio Access Network; NR; Physical channels and modulation (Release 15)," 3GPP TS 38.211 V15.0.0 (Dec. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.5.0 (Mar. 2019).
Third Generation Partnership Project, "Technical Specification Group Radio Access Network; Evolved Universal Terrestrial Radio Access (E-UTRA); Base Station (BS) conformance testing (Release 15)," 3GPP TS 36.141 V15.5.0 (Dec. 2018).
Third Generation Partnership Project, "Technical Specification Group Radio Access Network; Evolved Universal Terrestrial Radio Access (E-UTRA); Base Station (BS) conformance testing (Release 16)," 3GPP TS 36.141 V16.0.0 (Dec. 2018).
Third Generation Partnership Project, "Technical Specification Group Radio Access Network; Evolved Universal Terrestrial Radio Access (E-UTRA); Base Station (BS) conformance testing (Release 15)," 3GPP TS 36.141 V15.1.0 (Dec. 2017).
Third Generation Partnership Project, "Technical Specification Group Radio Access Network; NR; Physical layer procedures for control (Release 15)," 3GPP TS 38.213 V15.5.0 (Mar. 2019).
Third Generation Partnership Project, "Technical Specification Group Radio Access Network; NR; Radio Resource Control (RRC) protocol specification (Release 15)," 3GPP TS 38.331 V15.1.0 (Mar. 2018).
Third Generation Partnership Project, "Technical Specification Group Radio Access Network; Spreading and modulation (FDD) (Release 15)," 3GPP TS 25.213 V15.0.0 (Jun. 2018).
Third Generation Partnership Project, "Technical Specification Group Radio Access Network; Spreading and modulation (FDD) (Release 14)," 3GPP TS 25.213 V14.0.0 (Mar. 2017).
Third Generation Partnership Project, "Technical Specification Group Radio Access Network; Spreading and modulation (FDD) (Release 11)," 3GPP TS 25.213 V11.4.0 (Dec. 2012).
Third Generation Partnership Project, "Technical Specification Group Radio Access Network; Evolved Universal Terrestrial Radio Access Network (E-UTRAN); Architecture description (Release 15)," 3GPP TS 36.401 V15.0.0 (Dec. 2017).
Third Generation Partnership Project, "Technical Specification Group Radio Access Network; Evolved Universal Terrestrial Radio Access Network (E-UTRAN); Architecture description (Release 15)," 3GPP TS 36.401 V15.1.0 (Dec. 2018).
Third Generation Partnership Project, "Technical Specification Group Radio Access Network; Evolved Universal Terrestrial Radio Access (E-UTRA); Requirements for support of radio resource management (Release 16)," 3GPP TS 36.133 V16.0.0 (Dec. 2018).
Third Generation Partnership Project, "Technical Specification Group Radio Access Network; Evolved Universal Terrestrial Radio Access (E-UTRA); Requirements for support of radio resource management (Release 15)," 3GPP TS 36.133 V15.5.0 (Dec. 2018).
Third Generation Partnership Project, "Technical Specification Group Radio Access Network; Evolved Universal Terrestrial Radio Access (E-UTRA); Requirements for support of radio resource management (Release 15)," 3GPP TS 36.133 V15.1.0 (Dec. 2017).
Third Generation Partnership Project, "Technical Specification Group Radio Access Network; NR; Physical channels and modulation (Release 15)," 3GPP TS 38.211 V15.5.0 (Mar. 2019).
Third Generation Partnership Project, "Technical Specification Group Radio Access Network; Physical layer procedures (TDD) (Release 15)," 3GPP TS 25.224 V15.0.0 (Jun. 2018).
Third Generation Partnership Project, "Technical Specification Group Radio Access Network; Physical layer procedures (TDD) (Release 14)," 3GPP TS 25.224 V14.0.0 (Mar. 2017).
Third Generation Partnership Project, "Technical Specification Group RAN; NR; Base Station (BS) conformance testing Part 2: Radiated conformance testing (Release 15)," 3GPP TS 38.141 V0.0.3 (Aug. 2017).
Verdu et al., "Spectral Efficiency of CDMA with Random Spreading," IEEE Transactions on Information Theory, vol. 45, No. 2 (Mar. 1999).
Third Generation Partnership Project, "Technical Specification Group Radio Access Network; NR; NR and NG-RAN Overall Description; Stage 2 (Release 15)," 3GPP TS 38.300 V15.4.0 (Dec. 2018).
Third Generation Partnership Project, "Technical Specification Group Radio Access Network NR; NR and NG-RAN Overall Description; Stage 2 (Release 15)," 3GPP TS 38.300 V15.1.0 (Mar. 2018).
ZTE et al., "Considerations on random access in NTN," 3GPP TSG RAN WG1 Meeting #92, R1-1801830, Athens, Greece (Feb. 26-Mar. 2, 2018).
Thales et al., "NR-NTN: Analysis of the applicability of NR numerology to satellite communication," 3GPP TSG RAN Plenary Meeting #78, RP-172277, Lisbon, Portugal (Dec. 18-21, 2017).
Third Generation Partnership Project, "Technical Specification Group Radio Access Network; Study on New Radio (NR) to support non terrestrial networks (Release 15)," 3GPP TR 38.811 V0.4.0 (RP-180545) (Mar. 2018).

* cited by examiner

TIMING ADVANCE FOR NON-TERRESTRIAL NETWORK COMMUNICATION

CROSS-REFERENCE TO RELATED APPLICATIONS

This application is a continuation of U.S. patent application Ser. No. 17/044,586 filed Oct. 1, 2020, which is a U.S. National Stage, under 35 U.S.C. § 371, of International Application No. PCT/US2019/025628, filed Apr. 3, 2019, which claims the benefit of U.S. Provisional Application No. 62/652,182, filed Apr. 3, 2018, and U.S. Provisional Application No. 62/652,698, filed Apr. 4, 2018, the contents of which are incorporated herein by reference.

BACKGROUND

Non-terrestrial networks (e.g., satellites) may play an important part in enabling communication in places where terrestrial mobile telephony is unviable. NTN services have many uses, such as broadcast applications (e.g., television), and emergency applications (e.g., essential services to offshore oil-rigs and shipping operations). NTN services may be useful where terrestrial cellular and land based communication systems are not accessible. Further, NTN services may augment existing terrestrial communication systems.

SUMMARY

Methods, systems, and devices for addressing timing advance (TA) in non-terrestrial network communication is disclosed herein. A wireless transmit and receive unit (WTRU) may receive system information from a base station attached to an airborne or spaceborne vehicle that indicates a physical random access channel (PRACH) resource. The WTRU may determine a timing offset based on a plurality of information, such as the location information and the system information. The WTRU may transmit a preamble using the timing offset via the PRACH resource. The base station may receive the preamble and send a random access response (RAR) that includes, for example, a TA command. The WTRU may receive the RAR including the TA command and combine the timing offset with the TA command to determine an actual TA, after which the WTRU may use the actual TA for uplink transmissions.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
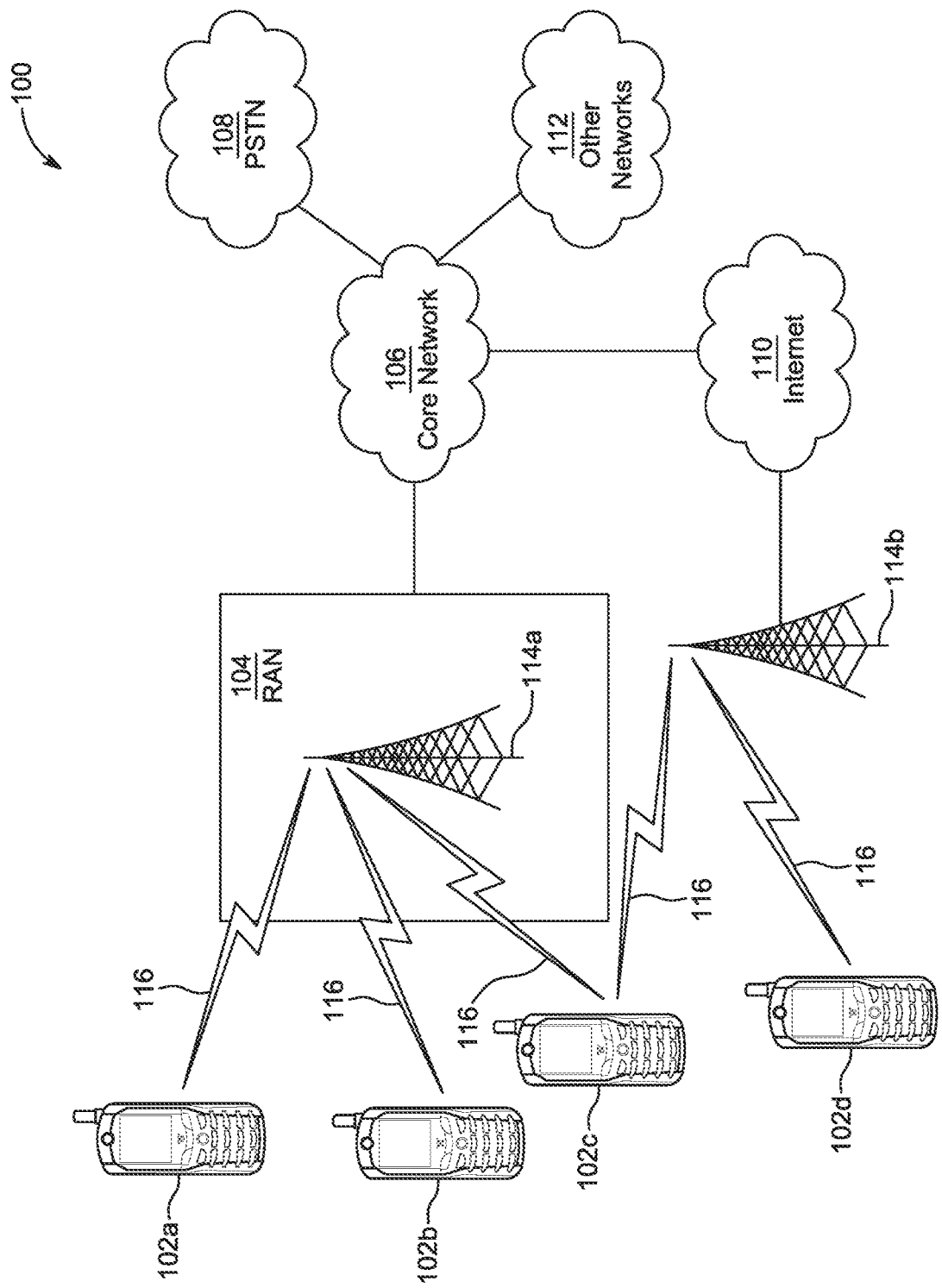
FIG. 1A is a system diagram illustrating an example communications system in which one or more disclosed embodiments may be implemented.

Satellites play an invaluable part in enabling communication in places where "last mile" fiber cable or terrestrial mobile telephony is unviable. Sometimes, satellite services may supplement or replace terrestrial cellular and/or land based communication systems. Further, satellite services are used in many situations where other forms of communication may not be optimal, such as broadcast applications like television, and/or emergency use cases like essential services to offshore oil-rigs and shipping operations.

Generally, a satellite may be any device that facilitates communication and that is physically located above the surface of the earth such that it has no physical attachment to the ground. In some instances, a satellite may be attached to a High Altitude Platform (e.g., balloon) or a plane. In other instances, a Satellite's position above the surface of the earth may be such that it can be categorized in one of several orbital classes. In the low earth orbit (LEO) class, satellites may be between at altitude 400-2000 kilometers with a common altitude being 700 kilometers. In the medium earth orbit (MEO) class, satellites may be at an altitude of 2000-32000 kilometers with a common altitude being 20000 kilometers. In the geo-synchronous (GSO) or geo-stationary orbit (GEO), the satellites may be quasi-fixed at approximately 36000 kilometers.

With higher altitudes, propagation delay and power budgets may be issues while with lower altitudes, Doppler and mobility may be issues. With lower orbits, the satellites experience atmospheric drag and per Kepler's laws of planetary motion, where it can be stated that the lower the orbital altitude, the higher the velocity of the satellite on the orbit.

Satellites may provide true broadband connectivity to terrestrial users complementing land-based mobile and fixed wireless systems. In some cases, users utilizing Satellite based services may be limited to those who can afford or to those who have no other alternatives. For satellites to move beyond these cases and be considered a pervasive and viable technology the volume of users that can be supported must increase and unicast services in addition to existing broadcast services must become more prevalent. With an increase in user count, the volume of data serviceable increases almost linearly.

A commercial communications satellite with an acceptable link budget may be either LEO or MEO and operate on very high frequencies. With satellites that have high velocities, and correspondingly a high Doppler, there may be issues with synchronization. Satellite link budgets may be built with high link margins to overcome rain and other atmospheric aberrations that may arise during communication. Despite this, the signal to noise ratio (SINR) experienced on the downlink and uplink is so low that the highest modulation-coding schemes employed in satellite links are several orders lower than what is comparable in terrestrial systems.

The long propagation delays for satellite links are several orders larger than observed in a terrestrial system. Satellite links, though reliable, can suffer from high latencies. Services that use transmission control protocol (TCP) as the transport layer may also be susceptible to latency and performance degradation.

Generally, there may be communication system of a terrestrial network (i.e., no satellites involved) where satellites may be added; a network that includes the use of satellites may be considered a Non-Terrestrial Networks (NTN). FIG. 1A is a diagram illustrating an example communications system 100, which may be a part of terrestrial network or NTN. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements. Further, in some instances, base stations may be satellites, acting as a connection between a WTRU and one or more communication networks. As used herein, the terms, eNB, gNB, satellite, base station, or the like may be interchangeable.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
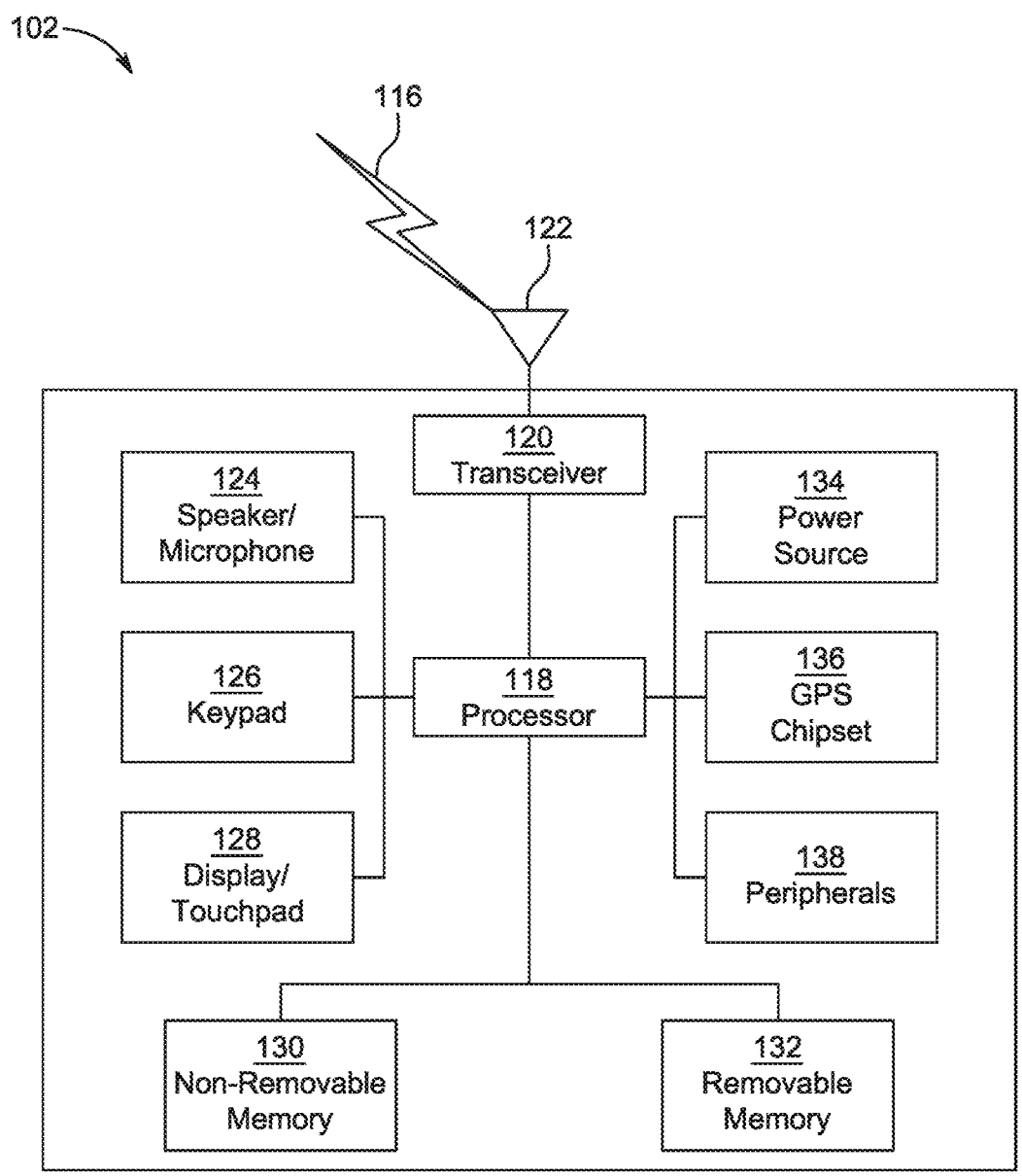
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
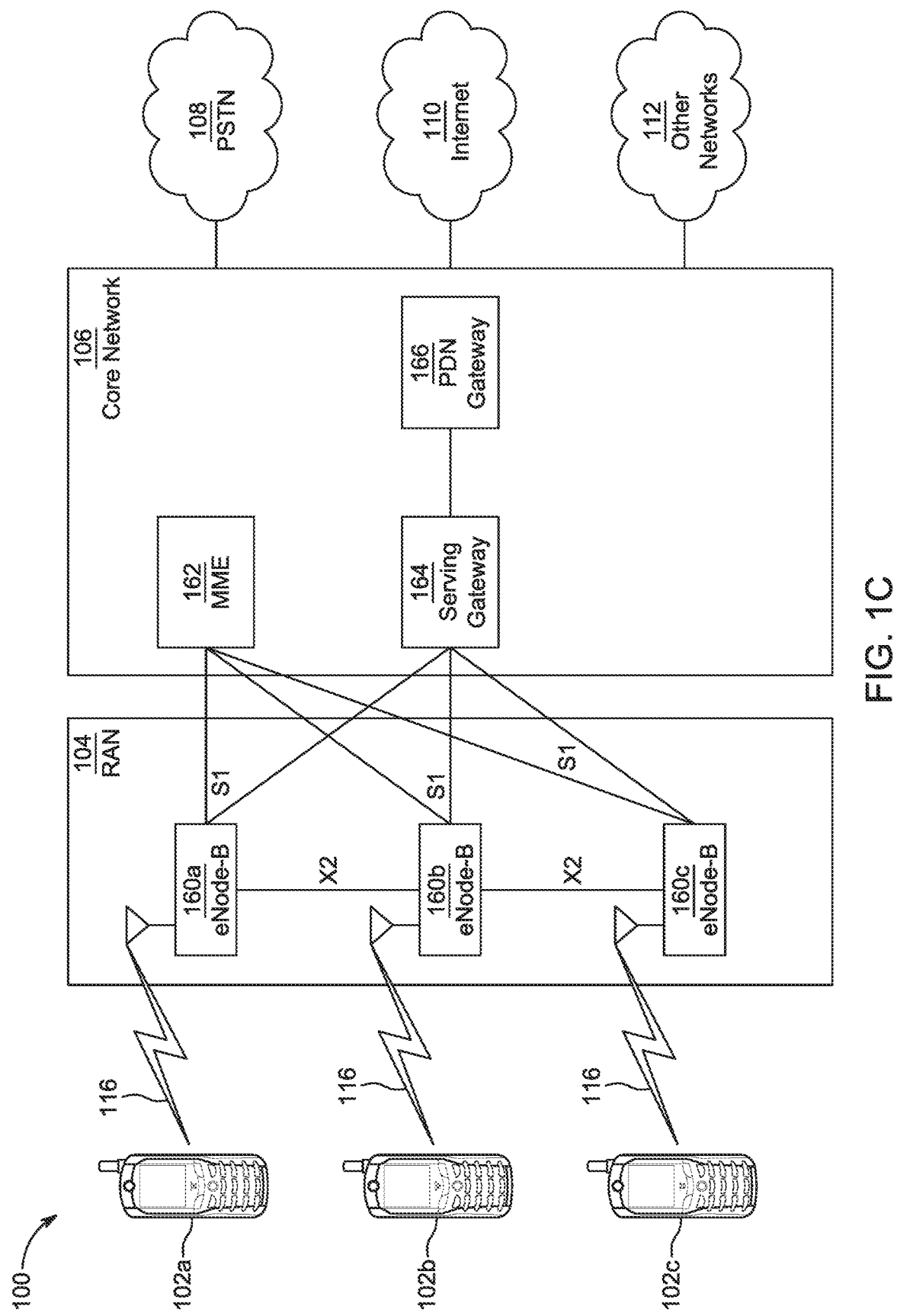
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
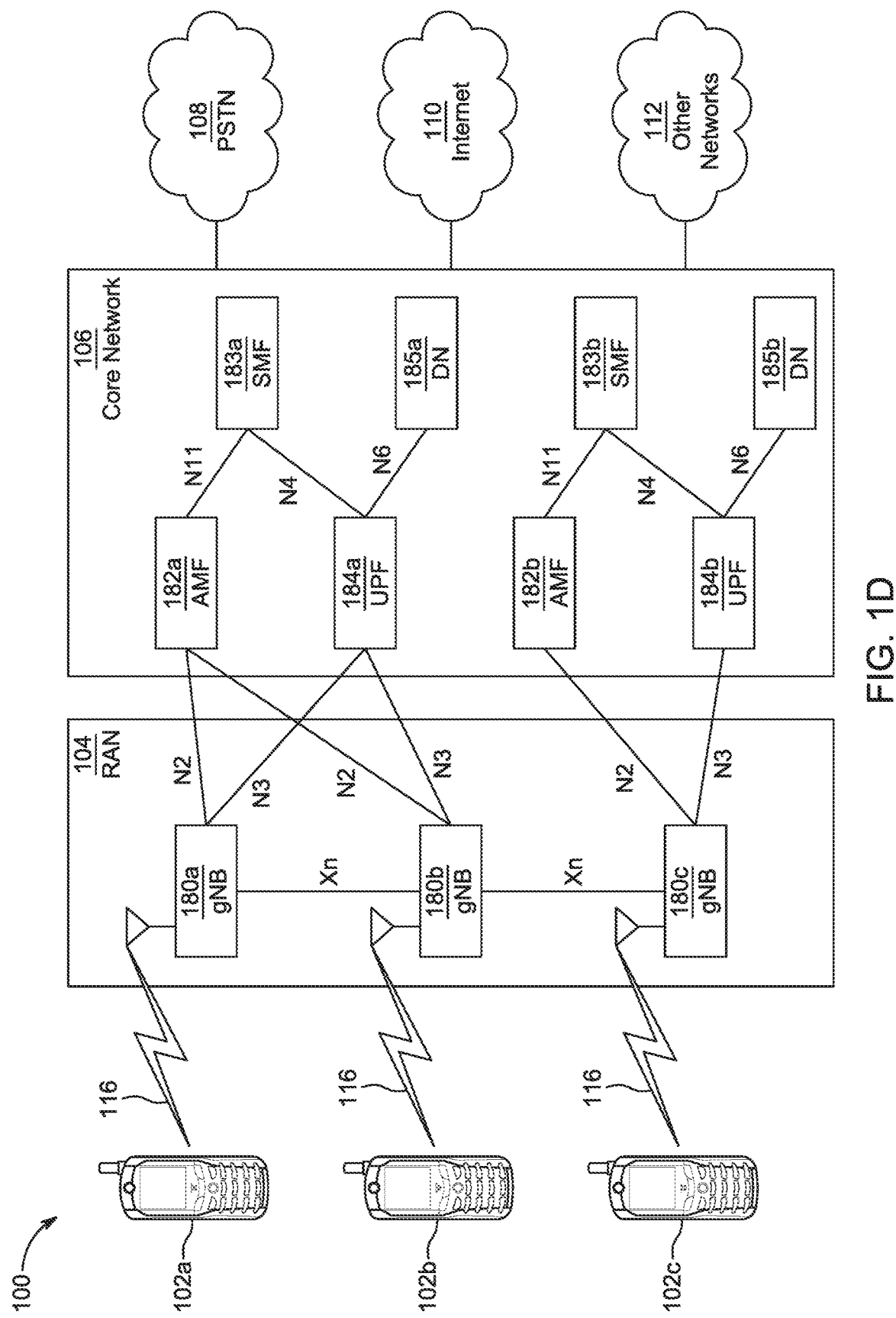
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Generally, during the initial access of a WTRU a random access channel (RACH) procedure may be used for uplink time synchronization where a WTRU may send a random access preamble to a gNB in the uplink. The preamble may be sent over a physical random access channel (PRACH). A random access response (RAR) may be sent by the gNB to the WTRU in the downlink indicating reception of the preamble and providing a time-alignment, (i.e., timing advance) command adjusting the transmission timing of the WTRU based on the timing of the received preamble.

Figure 2:
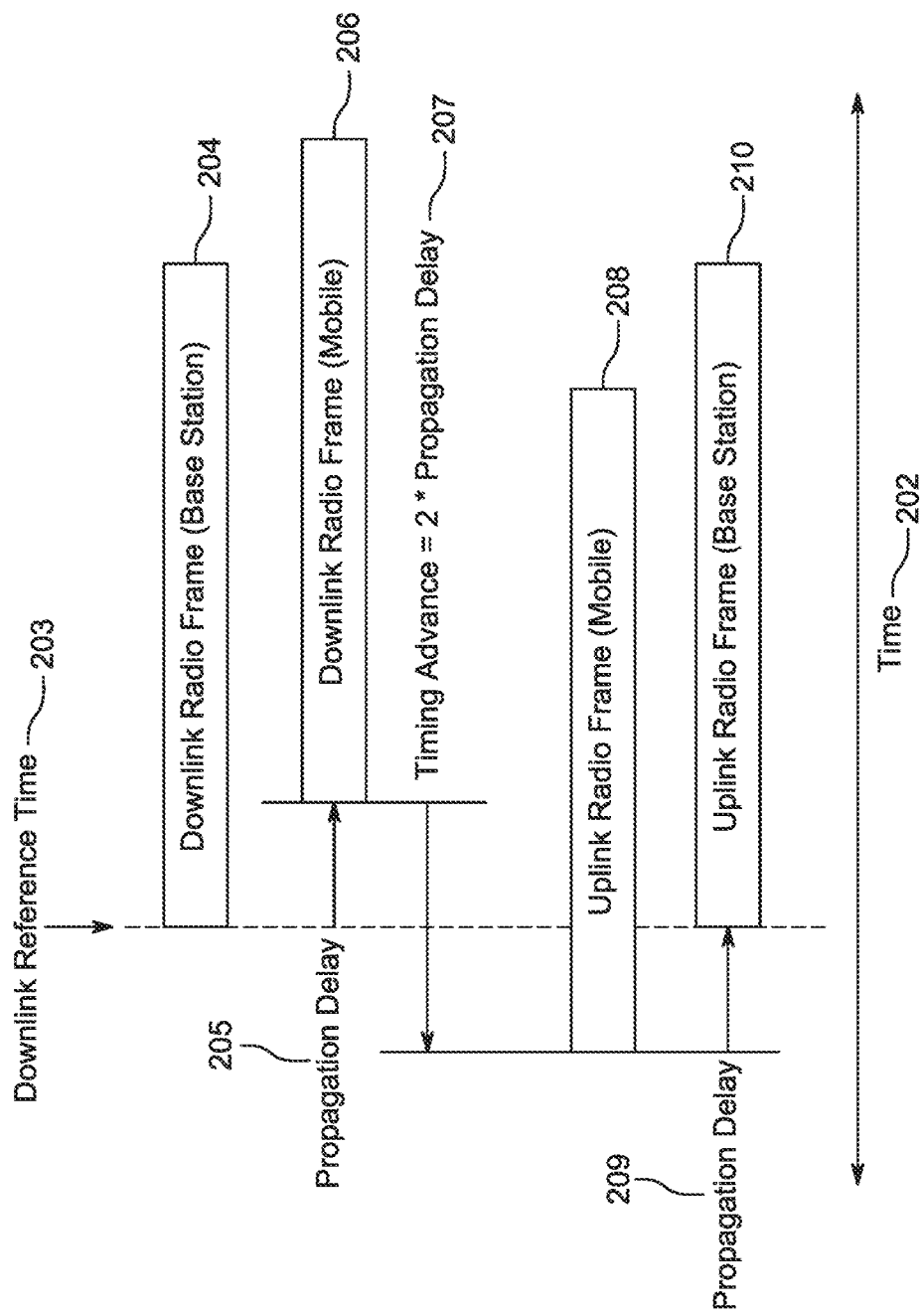
FIG. 2 is a diagram illustrating an example of timing advance according to one or more embodiments.

FIG. 2 is a diagram illustrating an example of timing advance, where the WTRU may perform downlink synchronization with a base station before performing any network access. Time 202 is shown in the horizontal axis.

Generally, at a downlink reference time 203 a base station may transmit a downlink radio frame 204. A WTRU may receive the downlink radio frame 206 after some amount of propagation delay 206. The base station may support several WTRUs spread throughout the coverage area and the propagation time of a downlink signal from the base station at to the closest WTRU may be shorter than the propagation time of the same signal to a WTRU much farther away from the base station. To compensate for the variance in propagation time for the various WTRUs in the coverage area, the base station may provide each WTRU a Timing Advance (TA) value 207. Relatedly, for the uplink, the base station may expect to receive all transmissions from all scheduled WTRUs for a specific transmission time interval (TTI) to be time aligned. The TA value is the time-unit by which a WTRU advances its uplink transmission so that its uplink frame arrives time-aligned with other uplink transmissions from other WTRUs. For example, the uplink radio frame may be sent at 208 based on the TA 207 so that the base station receives the uplink radio frame at 210 at the same time for multiple WTRUs.

Though OFDMA based systems involve a cyclic prefix to mitigate multi-path, the TA may be useful to ensure synchronous reception of uplink transmissions as shown in FIG. 2. Synchronous operation may not be possible until the TA is known at the WTRU and thus, the very first uplink access message may only occupy a portion of the RACH subframe with a significant guard period towards the end of the RACH subframe to ensure intra-cell interference is avoided.

Figure 3:
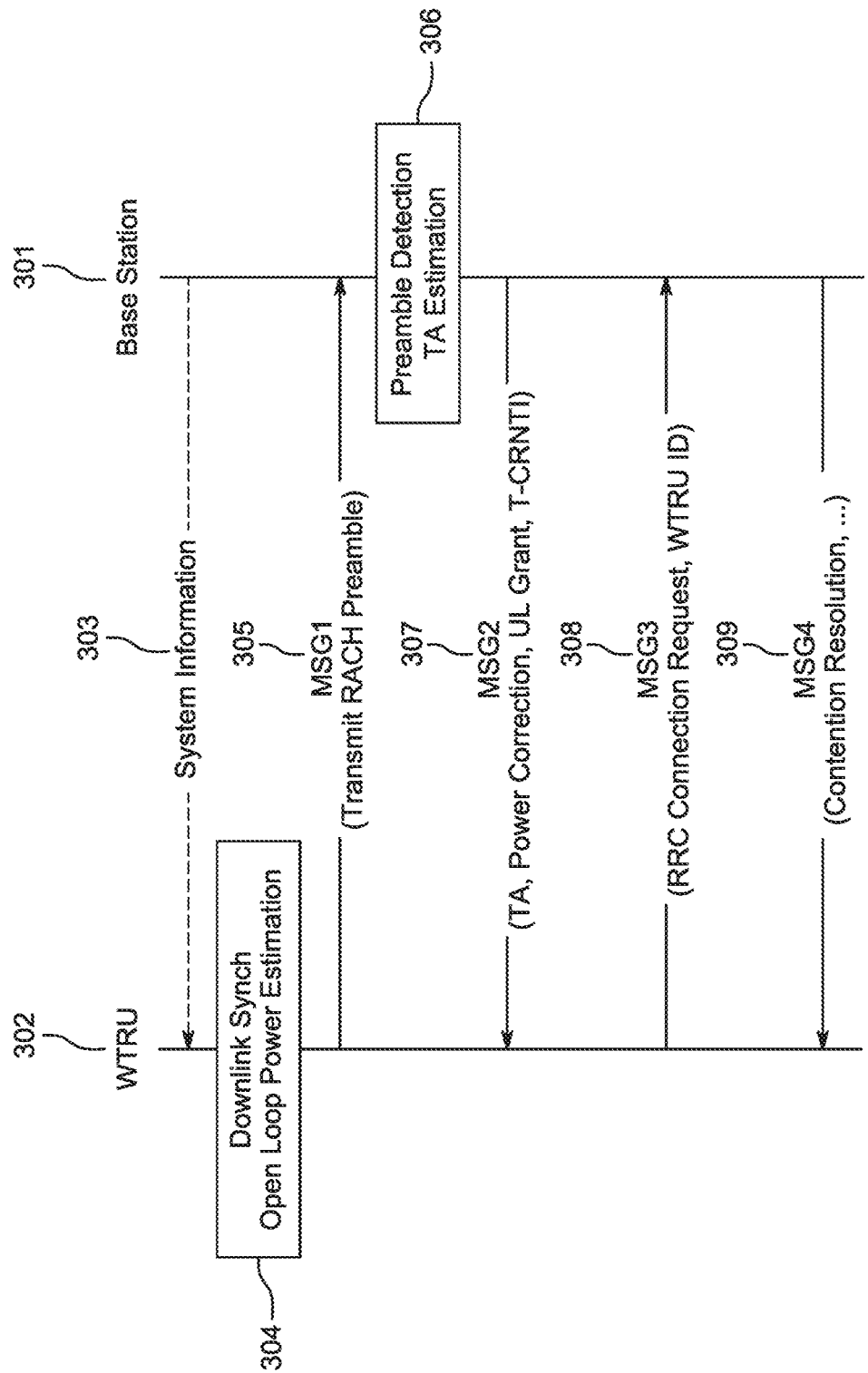
FIG. 3 is a diagram illustrating an example of a procedure for RRC connection from IDLE according to one or more embodiments.

FIG. 3 is a diagram illustrating an example procedure for RRC connection establishment from IDLE which may include the RACH procedure for uplink time synchronization. The WTRU 302 may enter RRC CONNECTED state after a 4-way signaling exchange with the base station 301 of information.

At 303, the WTRU 302 may receive system information from the base station 301. The WTRU 302 may perform DL synchronization at 304 and read the master information and system information blocks to determine the viability of the system. The WTRU 302 may also estimate the open loop transmit power required having measured the candidate cell and the corresponding DL transmit power. At 305, the WTRU 302 may select one preamble from among a superset of preambles available and transmit the sequence (MSG1) at a power level determined by the open loop setting. At 306, the base station 301, if it received and estimated the preamble correctly, may determine the cyclic shift and the associated propagation delay; then the base station 301 may convert the propagation delay into a TA and determine if the WTRU needs to perform any power correction.

At 307, the base station may transmit the RACH response (MSG2), the TA to apply along with a nominal UL grant for the WTRU 302 to transmit its identity and connection establishment cause. The base 301 station may also allocate a temporary cell radio network identity (T-CRNTI). At 308, the WTRU 302 may transmit its identity and establishment cause (MSG3) to the base station 301 on the provided UL grant from MSG2. At 309, the base station 301 may be obligated to notify (MSG4) the WTRU of a successful procedure at which point the WTRU 302 may consider contention to be resolved completely. If contention is not resolved, the WTRU 302 may return back to IDLE mode and reattempt the entire sequence detailed above.

For RACH in NR and LTE, the random-access preamble of a terrestrial cellular system using CAZAC sequences of odd length N and $u^{th}$ root index may be expressed by the following equation:

$$x_u(n) = e^{\frac{-j\pi u n(n+1)}{N}}.$$

The post-processing signal at the receiver may be:

$$y(n) = hx(n-\tau)e^{\frac{j2\pi n \Delta f}{N}}$$

Where y(n) represents the received signal, h embodies the channel response, a representation of the received Signal Noise Ratio (SNR) and x stands for the transmitted signal. τ is the normalised transmission delay between users and the base station and Δf is the frequency offset caused by shifts in Doppler shift and oscillator uncertainty, if any. A TA estimate may be projected by the autocorrelation property of a CAZAC sequence. Correlation output of the CAZAC sequence may be written as below.

$$\text{corr}(q) = \sum_{n=0}^{N-1} y(n)x*(n-q)$$

$$\text{corr}(q) = \sum_{n=0}^{N-1} h e^{\frac{-j\pi u(n-\tau)(n-\tau+1)}{N}} e^{\frac{j2\pi n \Delta f}{N}} x*(n-q)$$

$$= \sum_{n=0}^{N-1} h e^{\frac{-j2\pi(uq-u\tau-\Delta f)}{N}} e^{\frac{-j\pi u(\tau^2-\tau+q-q^2)}{N}}$$

$$= h e^{\frac{-j\pi u(\tau^2-\tau+q-q^2)}{N}} \sum_{n=0}^{N-1} e^{\frac{-j2\pi(uq-u\tau-\Delta f)}{N}}$$

Correlation may be maximum when uq−uτ−Δf=0, alternatively when $$q = \tau + \frac{\Delta f}{N}.$$

Using this generality, TA estimate τ can be cast as $$\left(\tau = q - \frac{\Delta f}{N}\right).$$

However, from this simplification, the frequency offset Δf may be present in the final TA estimate τ. The presence of frequency offset may have an unfavorable influence on the TA estimate.

In NR, for a subcarrier spacing of $2^\mu \cdot 15$ kHz, the TA command for a Timing Advance Group (TAG) may indicate the change of the uplink timing relative to the current uplink timing for the TAG as multiples of $16 \cdot 64 \cdot T_c/2^\mu$ where the time unit $T_c=1/(\Delta f_{max} \cdot N_f)$ with $\Delta f_{max}=480 \cdot 10^3$ Hz and $N_f=4096\mu$ is related to the numerology u which is shown in Table 1. A TAG is a group of uplink carriers that will share a TA.

TABLE 1

| Supported transmission numerologies in NR | |
|---|---|
| μ | Δf = $2^\mu$ · 15[kHz] |
| 0 | 15 |
| 1 | 30 |
| 2 | 60 |
| 3 | 120 |
| 4 | 240 |

When an RAR is sent/received, the TA command may indicate an index value $T_A=\{0, 1, 2, \ldots, 3846\}$ where an amount of the time alignment for the TAG for subcarrier spacing of $2^\mu \cdot 15$ kHz is given by $N_{TA}=T_A \cdot 16 \cdot 64 \cdot T^c/2^\mu \cdot N_{TA}$ is the timing offset between uplink and downlink radio frames at the WTRU and is relative to the subcarrier spacing of the first uplink transmission from the WTRU after the reception of the RAR. $N_{TA}$ be expressed in units of $T_s$ may where $T_s=1/(2048 \cdot 15000)=1/30,720,000$. In NR, the TA command may indicate a maximum of 2 msec timing alignment for 15 kHz subcarrier spacing which corresponds to $T_A=3846$: $N_{TA}=3846 \cdot 16/30,720,000=2$ msec.

In NR, a PRACH preamble may be sent via a PRACH resource. The main part of the PRACH preamble may be a prime-length Zadoff-Chu (ZC) sequence that provides a good auto-correlation property, in respect to its cyclic shifts, which may be needed for time synchronization. For a certain length, different ZC sequences may be obtained using different roots. The different ZC sequences may have good cross-correlation properties which may be used for distinguishing WTRUs.

A PRACH preamble may have multiple formats, each with a different length, cyclic prefix (CP) and guard time (GT). The PRACH format may be identified from a PRACH configuration index which may be transmitted by a gNB in higher layer signaling through the system information blocks (SIBs). In NR, four PRACH formats may be associated with the preamble sequence length of 839, as shown in Table 2 and additional formats are introduced for the preamble sequence length of 139, as shown in the Table 3.

TABLE 2

Examples of PRACH preamble formats for $L_{RA} = 839$ and $\Delta f^{RA} \in \{1.25, 5\}$ kHz

| Format | $L_{RA}$ | $\Delta f^{RA}$ | $N_u$ | $N_{CP}^{RA}$ | Support for restricted sets |
|---|---|---|---|---|---|
| 0 | 839 | 1.25 kHz | 24576κ | 3168κ | Type A, Type B |
| 1 | 839 | 1.25 kHz | 2 · 24576κ | 21024κ | Type A, Type B |
| 2 | 839 | 1.25 kHz | 4 · 24576κ | 4688κ | Type A, Type B |
| 3 | 839 | 5 kHz | 4 · 6144κ | 3168κ | Type A, Type B |

TABLE 3

Examples of PRACH formats for $L_{RA} = 139$ and $\Delta f^{RA} = 15 \cdot 2^\mu$ kHz where $\mu \in \{0, 1, 2, 3\}$

| Format | $L_{RA}$ | $\Delta f^{RA}$ | $N_u$ | $N_{CP}^{RA}$ | Support for restricted sets |
|---|---|---|---|---|---|
| A1 | 139 | 15 · 2$^\mu$ kHz | 2 · 2048κ · 2$^{-\mu}$ | 288κ · 2$^{-\mu}$ | — |
| A2 | 139 | 15 · 2$^\mu$ kHz | 4 · 2048κ · 2$^{-\mu}$ | 576κ · 2$^{-\mu}$ | — |
| A3 | 139 | 15 · 2$^\mu$ kHz | 6 · 2048κ · 2$^{-\mu}$ | 864κ · 2$^{-\mu}$ | — |
| B1 | 139 | 15 · 2$^\mu$ kHz | 2 · 2048κ · 2$^{-\mu}$ | 216κ · 2$^{-\mu}$ | — |
| B2 | 139 | 15 · 2$^\mu$ kHz | 4 · 2048κ · 2$^{-\mu}$ | 360κ · 2$^{-\mu}$ | — |
| B3 | 139 | 15 · 2$^\mu$ kHz | 6 · 2048κ · 2$^{-\mu}$ | 504κ · 2$^{-\mu}$ | — |
| B4 | 139 | 15 · 2$^\mu$ kHz | 12 · 2048κ · 2$^{-\mu}$ | 936κ · 2$^{-\mu}$ | — |
| C0 | 139 | 15 · 2$^\mu$ kHz | 2048κ · 2$^{-\mu}$ | 1240κ · 2$^{-\mu}$ | — |
| C2 | 139 | 15 · 2$^\mu$ kHz | 4 · 2048κ · 2$^{-\mu}$ | 2048κ · 2$^{-\mu}$ | — |

For contention based RACH, two channels PCCH and PDCH may be BPSK modulated and code multiplexed with two different Walsh-Hadamard OVSF codes and mapped to I and Q paths respectively. Each channel PCCH and PDCH may have channel gain factors applied individually and finally the I/Q complex signal may be scrambled by a long complex scrambling code. The base station may implement a matched filter to identify single users. Matched filters may also be for phase estimation errors.

For RACH in WCDMA, the RACH may be a two-step process: First, a PRACH preamble part may be transmitted by the WTRU as a RACH, and second, the base station may signal acceptance via an Acquisition Indicator Channel (AICH). The WTRU may transmit a PRACH message part subsequently on a different transmission occasion informing the base station of the WTRU's actual identity.

For RACH in TD-SCDMA, a two-step uplink timing synchronization may be used where the WTRU may estimate the initial TA by performing measurements on the received downlink channels (e.g., Primary Common Control Physical Channel (P-CCPCH) and/or Downlink Pilot Channel (DwPCH)). The estimated initial TA may be used for SYNC-UL transmission on an Uplink Pilot Channel (Up-PCH) according to the timing of the received DwPCH. The base station (e.g., NodeB) may measure the received SYNC-UL timing deviation from the reference time and may signal the residual TA as a thirteen bit number (0-8191) being the multiple of ⅛ chips which is nearest to a received position of the UpPCH.

Generally, propagation delay is a factor that cannot be removed in any communications link since that delay is governed by the speed of light. For NTN systems, the gains that can be achieved by optimizing processing delays that may exist in hardware, software, and firmware may be minimal compared to the effect of propagation delay which can range from tens to a few hundreds of microseconds one way. Propagation delays in satellite links may be excessively high and depend on the orbital positions of the satellite. For example, a satellite link, the target for a user plane round trip time (RTT) may be as high as 600 ms for a geostationary (GEO) satellite system, up to 180 ms for a medium earth orbit (MEO) satellite system, and up to 50 ms for low earth orbit (LEO) satellite system.

Given the high latencies on a NTN link, a transmission error and subsequent retransmission(s) to recover from the initial transmission errors may degrade the spectral efficiency of the link and prolong the duration of the session. With decreasing spectral efficiencies, it may take the satellite system longer to service WTRUs. The longer WTRUs remain un-serviced, the load on the satellite system may increase. These long latencies may adversely impact initial access to the system and the overall throughput achievable on the link. It follows that TA mechanisms for terrestrial networks may not be appropriate for the requirements of a NTN. Accordingly, there is a need for systems, methods, and devices as discussed herein that can mitigate the effects of pronounced propagation delays to improve the quality of experience for NTN communication.

Figure 4:
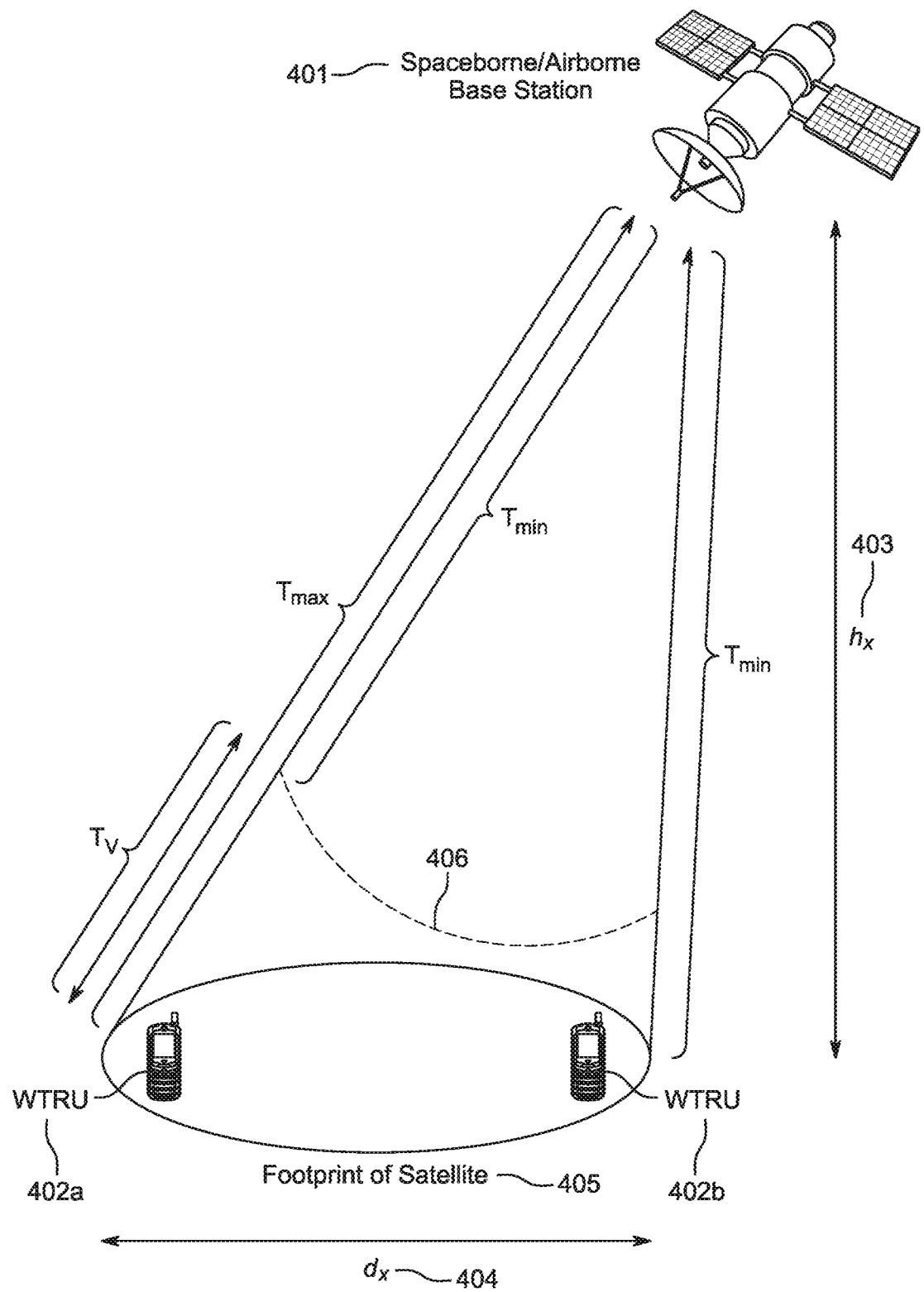
FIG. 4 is diagram illustrating an example non-terrestrial network communications where the variation of the round trip time may be smaller than the maximum round-trip time according to one or more embodiments.

In order to accommodate NTN communication, there is a need for a better analysis of TA for NTNs. FIG. 4 is a diagram that illustrates an example of some factors involved with NTN communication. There may be a base station 401 located above the earth's surface, such as a spaceborne or airborne satellite with a base station. The base station 401 may communicate with WTRUs 402a and 402b located approximately at the Earth's surface. The distance from the base station 401 to the Earth may be h 403. There may be a satellite footprint 405 with a diameter d, which may also be considered to be the cell associated with the base station 401. The minimum RTT for the footprint 405 time may be $T_{min}$ multiplied by two, which corresponds to the maximum elevation angle between the Earth and the base station 401. The maximum RTT for the footprint 405 may be $T_{max}$ multiplied by two, which corresponds to the minimum elevation angle. $T_v$ is the largest variation in the footprint 405 time, which is the difference between the $T_{max}$ and $T_{min}$.

A RTT may be estimated by the distance between the base station 401 (e.g., gNB) and a WTRU, divided by the speed of the light. The distance between the base station 401 and WTRU 402a/b may be estimated by the distance of the base station 401 from Earth h and the angle of elevation. Therefore, the base station 401, knowing its distance from the Earth and the footprint of its beam on the Earth h, may estimate the maximum and the minimum distances to WTRUs and the maximum and the minimum RTTs. The maximum RTT and the range of variation of RTT may be quite different, unlike terrestrial cellular networks.

For example, as shown in FIG. 4, for a bases station 401 on a GEO satellite, the maximum RTT may be as high as 600 ms, but the variation of the round trip time, which is dependent on the footprint of the base station 405 and angle of elevation may be much smaller than the maximum RTT.

NTNs may cover a broad range of airborne (e.g., High Altitude UAS Platforms (HAPs)) or spaceborne (e.g., Satellites (LEO, MEO, GEO) vehicles for transmission, and each may have a different round trip propagation delay. Therefore, a flexible TA mechanism which may efficiently adapt to the specific deployment scenario under the same general framework is desirable.

In order to accommodate NTN communications, a base station (e.g., gNB) may transmit an extended TA command, $T_{EA}$, in RAR in the form of a bitfield which may have a larger bitfield length than the one used for the terrestrial networks. In this way, a RTT of up to 600 ms may be supported for subcarrier spacing of 15 KHz which is the maximum expected RTT for non-terrestrial networks. The bitfield of the extended TA command may be, for example, approximately 20 to 21 bits.

In an example where 20 bits are indicated in an extended TA command, the range of $T_{EA}$ may be $\{0, 1, \ldots, (2^{20}-1)\}$. In this case, the maximum supported timing alignment for subcarrier spacing of 15 kHz is 546 msec: $N_{TA,GEO}=(2^{20}-1)\cdot 16/30{,}720{,}000 \approx 546$ msec.

In an example where 21 bits are indicated in an extended TA command, the range of $T_{EA}$ may be $\{0, 1, \ldots, 1152000\}$. In this case the maximum supported timing alignment for subcarrier spacing of 15 kHz is 600 msec: $N_{TA,GEO}=1{,}152{,}000 \cdot 16/30{,}720{,}000=600$ msec.

However, using a fixed large bitfield for the TA is inefficient and adds overhead, therefore a more accurate estimation of the TA may be needed.

Additionally, in considering TA estimation for NTN, frequency offsets that exist in a link may influence the accuracy of the TA estimate. When frequency offset is fractional (i.e., not an integer multiple of subcarrier spacing), the RACH missed detection probability may increase because the correlation peak value decreases with increasing frequency offset. When the frequency offset is an integer multiple of the sub-carrier spacing, the offset leads the peak of correlator to be shifted, causing that TA estimate to be incorrect, and increasing the false detection probability. To deal with frequency offsets, it may be possible to apply cyclic shift restriction as it is done in LTE and peak combining to avoid the adverse effects of frequency offset. However, such a scheme may need to consider high Doppler and large variation in Doppler for a NTN. Frequency offset in terrestrial systems may be negligible (i.e., less than one subcarrier bandwidth) and the upper limits considered for WTRU speed may be in the range of vehicle speeds for synchronization and compensation. In NTN (i.e., satellite communications) the difference in velocity between the satellite and the WTRU may be far greater, thereby contributing to very high Doppler and variation in Doppler within the footprint of satellite transmission.

Further, in some situations, the velocity of a satellite may not be constant and may change depending on the prevailing orbital position and orbital shape. The differential velocity between the satellite (e.g., as high as 28000 km/h) and the WTRU (e.g., high as 1000 km/h) can diverge significantly depending on the position and direction of the WTRU within a spot beam and the WTRU's elevation angle. The movement of the satellite in orbit is elliptical with some eccentricity and not necessarily free of wobbles. Small fluctuations in earth's gravity as well as the position of the moon with respect to the satellite position have impacts on the satellite's linear movement. Thus, there may be aberrations in a satellite's orbit that cannot be pre (or) post compensated for easily. Accordingly, there is a need for systems, methods, and devices as discussed herein that can address the challenging nature of TA estimation for NTN.

As explained earlier, TA estimate accuracy may be tied to the frequency offset that exists. CAZAC sequences may be ideal for estimating TA estimate but may underperform in systems where frequency offsets exist. A mechanism to mitigate the frequency offset, or better yet, to perfectly suppress the frequency offset that may exist may be useful to address these issues.

In one approach, there may be a scheme where a base station generates TA estimates even in the presence of frequency offsets. Instead of transmitting a CAZAC sequence, a WTRU may transmit x(n) as a composite tuple of CAZAC sequence, R, as shown in Equation (1).

$$x(n) = \frac{1}{\sqrt{2}}(R(n) + R^*(n)) \quad \text{Equation (1)}$$

The CAZAC sequence to be selected may follow NR protocols but the WTRU may transmit 503 a composite tuple of the CAZAC sequence and its conjugate instead as in equation (1). The received signal y(n) at the base station may be modeled as in equation (2).

$$y(n) = \frac{n}{\sqrt{2}}(R(n-\tau) + R^*(n-\tau))e^{\frac{j2\pi n \Delta f}{N}} \quad \text{Equation (2)}$$

Figure 5:
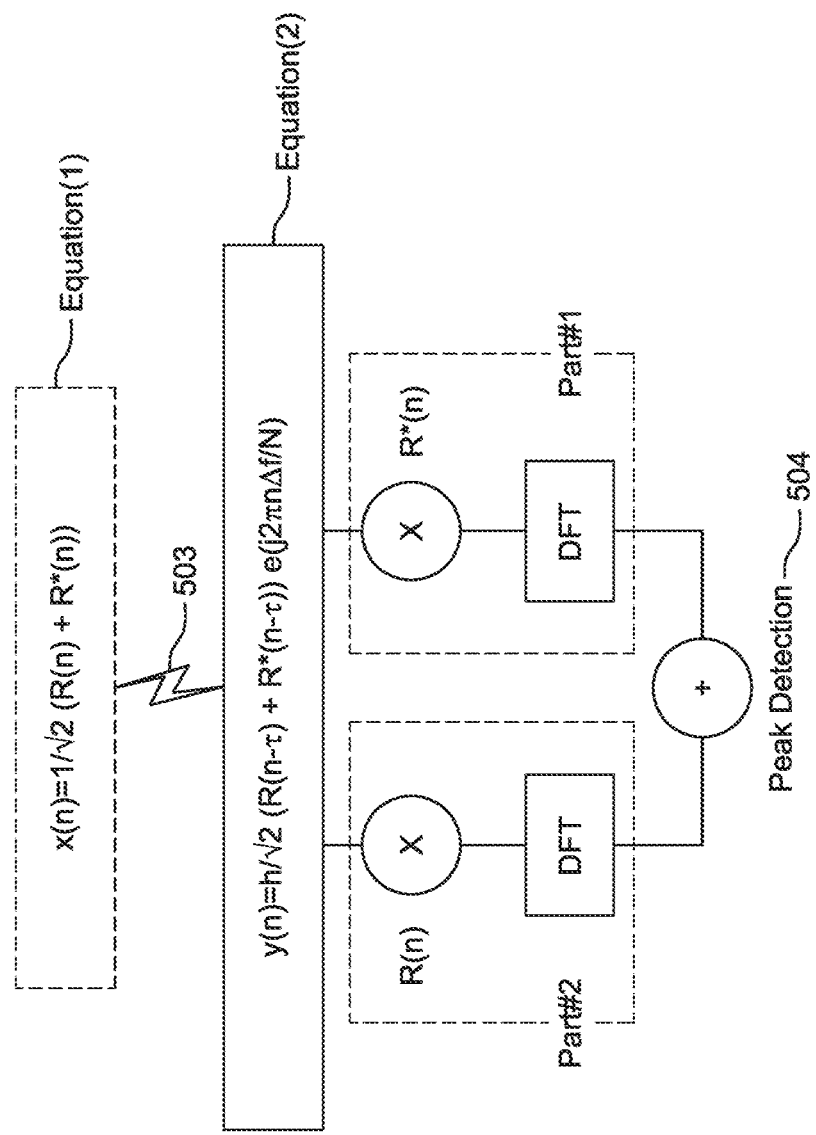
FIG. 5 is a diagram illustrating an example procedure of timing advance estimation at the receiver according to one or more embodiments.

Though it appears from Equation (1) that only the Real part of the CAZAC sequence may be transmitted, the composite tuple preserves the useful CAZAC sequence properties when correlated with the original CAZAC and its conjugate respectively at the receiver. At the receiver, if the received signal is processed twice first by multiplying the received signal by the conjugate of the original CAZAC sequence followed by a DFT procedure, and secondly the received signal is multiplied by the replica of the original CAZAC sequence followed by a DFT, the computation intensive cyclic convolution may be avoided. FIG. 5 shows a diagram illustrating an example of this procedure.

Analyzing the functions inside the dotted frame marked "Part #1" in FIG. 5, that the received signal is multiplied by the conjugate of the CAZAC sequence before applying an N point DFT.

$$(n)R^*(n) = \quad \text{Equation (3)}$$
$$\frac{h}{\sqrt{2}}R(n-\tau)e^{\frac{j2\pi n \Delta f}{N}}R^*(n) + \frac{h}{\sqrt{2}}R^*(n-\tau)e^{\frac{j2\pi n \Delta f}{N}}R^*(n)$$

If the two quantities on either side of the addition term in Equation (3) are termed Quantity #1 and Quantity #2 and operated individually before performing an N point DFT, then in solving for the term Quantity #1, it may be noted that:

$$hR(n-\tau)e^{\frac{j2\pi n\Delta f}{N}}R^*(n) = he^{\frac{-j\pi u(n-\tau)(n-\tau+1)}{N}}e^{\frac{j2\pi n\Delta f}{N}}e^{\frac{j\pi un(n+1)}{N}} \quad \text{Equation (4)}$$

$$= he^{\frac{j2\pi n(u\tau+\Delta f)}{N}}e^{\frac{-j\pi u(\tau^2-\tau)}{N}} \quad \text{Equation (5)}$$

$$Y[q] = DFT\left(he^{\frac{j2\pi n(u\tau+\Delta f)}{N}}e^{\frac{-j\pi u(\tau^2-\tau)}{N}}\right), \text{ for } q = 0, 1, \quad \text{Equation (6)}$$

$$2 \ldots N-1 = \sum_{n=0}^{N-1}he^{\frac{j2\pi n(u\tau+\Delta f)}{N}}e^{\frac{-j\pi u(\tau^2-\tau)}{N}}e^{\frac{-j\pi unq}{N}} =$$

$$he^{\frac{-j\pi u(\tau^2-\tau)}{N}}\sum_{n=0}^{N-1}he^{\frac{-j2\pi n(q-u\tau-\Delta f)}{N}}$$

Correlation is maximum when $q_1=q=u\tau+\Delta f$ in Equation (6)

$$q_1 = u\tau + \Delta f \quad \text{Equation (7)}$$

Similarly, operating on Quantity #2 in Equation (3) results in the following.

$$hR^*(n-\tau)e^{\frac{j2\pi n\Delta f}{N}}R^*(n) = he^{\frac{j\pi u(n-\tau)(n-\tau+1)}{N}}e^{\frac{j2\pi n\Delta f}{N}}e^{\frac{j\pi un(n+1)}{N}} \quad \text{Equation (8)}$$

Since u is the root index for the CAZAC sequence, if (u+v=N), then substituting u=(−v+N) and u≠v, $$Y[q] = DFT\left(he^{\frac{j\pi u(n-\tau)(n-\tau+1)}{N}}e^{\frac{j2\pi n\Delta f}{N}}e^{\frac{j\pi un(n+1)}{N}}\right)$$

captures statistics that may be relevant only to background noise and may be inconsequential. Therefore, in revisiting equation (7) it may be summarized that Part #1 results in a peak correlated value when $q_1=u\tau+\Delta f$.

Similarly, it may be proven that peak correlated value for Part #2 occurs when $q_2=q=-u\tau+\Delta f$.

$$q\_2 = -ut+\Delta f \quad \text{Equation (9)}$$

Subtracting equation (7) from equation (9), TA estimate τ may be estimated.

$$\tau = \frac{q_1 - q_2}{2u}$$

In the above equation, the TA estimate may be unaffected by the presence of any frequency offset (Δf) and thus the estimate may be reliable. As in LTE and NR, the base station may signal the RACH parameters such as the CAZAC root sequence to use and any cyclic shift restrictions that need to be applied in system information. The WTRU may select the preamble index using procedures after the reading of system information. The WTRU, however, may transmit a composite tuple of a CAZAC sequence and its conjugate as highlighted in Equation (1). The base station may estimate the TA that is required for the WTRU as shown in FIG. 5. The base station may subsequently respond to the WTRU with the TA estimate t and other parameters such as UL grant and power correction value (e.g., the base station may command the WTRU to use a TA and/or power correction value). This approach may work effectively for any system where frequency offsets are likely to be problematic and us not necessarily restricted to NTN In further addressing the challenges of NTN communication, the WTRU may contribute to the determination of the TA, enabling a fully or semi-autonomous approach to the TA estimation.

In some cases, a WTRU may perform autonomous regulated TA whereby the WTRU estimates the TA required prior to the commencement of UL access. Further, the WTRU may estimate the TA necessary based on absolute Coordinated Universal Time (UTC) corresponding to a {System Frame Number (SFN), Subframe Number (SF)} and the GPS time maintained at the WTRU itself.

A NTN (e.g., one or more base stations in an NTN) may broadcast the formatted UTC, as part of a System Information block (SIB), corresponding to the absolute on-air transmission time of the SIB. For 3GPP, a logical synchronization port for phase, time, and frequency synchronization may be necessary at the base station. For E-UTRA, requirements may be specified to ensure eNB phase and timing requirements for TDD, MBSFN, and CoMP features are met with continuous time without leap seconds, traceable to a common time reference of UTC sourced from at least a Stratum 2 level clock. The jitter and wander on the sync-in port at the eNB may be in conformance to ITU-T protocols. The phase synchronization requirements may necessitate the base stations to have a common SFN initialization time and the maximum absolute deviation in frame start timing between eNBs on the same frequency may be mandated to be ±1.5 μs. Thus, each eNB may be guaranteed to maintain a very accurate clock conforming to the stringent requirements as discussed herein.

GPS time transfer is one method for synchronizing clocks and networks to UTC. For communication systems that require high precision frequency and time/phase accuracy, timing may be derived from GPS satellites. GPS satellites may distribute UTC as maintained by the United States Naval Observatory (USNO) with a time transfer accuracy relative to UTC of ≤40 nanoseconds 95% of the time. GPS time may not be corrected for leap seconds when controlled by UTC. The total signal path transmission delay computation begins with the range from the satellite to the receiver. Applying speed of light, the range may be converted to a time delay. This delay may then be corrected for ionospheric delay using a model provided in the navigation message, delays for the Sagnac effect, and lastly for hardware delays in receiver circuitry. The difference between the computed and measured time ticks may give the relationship between the receiver clock and GPS time. Once the relationship between the receiver clock and GPS time is established, timing as well as timing interval signals may be produced by the receiver. If time signals are required to maintain synchronization with UTC, timing and timing-interval signals such as one-pulse-per-second signal (1-PPS) may be set and pegged against UTC. Accuracies within the 50-nanosecond range may be possible with undegraded GPS signals referenced to UTC. Thus, a WTRU may maintain a high-fidelity clock disciplined by a GPS signal.

As mentioned earlier, a NTN base station may broadcast the formatted UTC as part of a SIB corresponding to the absolute on-air transmission time of the specific SIB. The SIB containing the UTC time may be periodically transmitted on the downlink at a periodicity, $T_{UTC}$, indicated by the scheduling block of a mandatory SIB, such as SIB #1. For example, if the SIB containing the UTC time is to be broadcast on a specific initial downlink SFN (e.g., SFN=10), and SF (e.g., SF=5), the corresponding free-running UTC formatted on-air absolute time may be transmitted at every $\{SFN, SF\}=\{10, 5\}*k*T_{UTC}$; where k is an integer ≥1. The periodicity $T_{UTC}$ may be semi-static and may be modified by the NTN base station as it chooses. However, the modified $T_{UTC}$ may be applied at the WTRU only after the value of the new $T_{UTC}$ is notified to the WTRUs via a system information modification indication procedure.

In one situation, the crystal oscillator maintaining time at the NTN base station may be infinitely accurate and the oscillator drift may conform to specification requirements as set out by 3GPP. Further, the SIBs carrying UTC time may be transmitted from the NTN base station at UTC time $(t1+k*T_{UTC}$; where k indicates the transmission occasion and is an integer ≥0) time units, and the corresponding SIBs may be received by a WTRU inside the spot-beam at UTC time $(t1+k*T_{UTC}+\delta_k$; where $\delta_k$ is the propagation time at corresponding k) respectively. The WTRU may determine the propagation time at each k by subtracting the received local GPS time aligned to the UTC from the corresponding UTC transmission time as $(\delta_k)$ time units. The propagation time may be estimated with high granularity and accuracy.

In a situation where the WTRU is stationary and the satellite is earth synchronous, where the position of the satellite is relatively stationary, the propagation time $(\delta_k)$ may be relatively the same for any k. Alternatively, if the satellite is not earth synchronous, $(\delta_k)$ may be different for any k regardless of whether the satellite is moving away or moving towards the WTRU with respect to a WTRU position within the spot-beam. The methodology described herein allows the derivation of $(\delta_k)$ in either case to a high accuracy.

Similar levels of accuracy may be obtained with other global navigation satellite systems (GNSS) such as Russia's Globalnaya Navigazionnaya Sputnikovaya Sistema (GLONASS), Europe's Galileo, and the like. Accuracy obtained with these systems may be comparable, and in some cases better or worse, than those obtained with GPS.

If each propagation time $(\delta_k)$ is known, then the WTRU may determine the corresponding distance $(\alpha_k)$ of the satellite at each instance k as $(\alpha_k=c*\delta_k)$, where c is the speed of light. Knowing $(\alpha_k$; for 0≤k<i) and utilizing Kepler's second law of planetary motion, the WTRU may determine the orbit shape as well as the satellite's position and distance $(\alpha_k)$ for any future value of k, i≤k accurately. Kepler's second law enables the determination of the velocity of the satellite around any elliptical orbit no matter the eccentricity. It affirms that a line between the earth and the satellite sweeps equal areas in equal time-intervals.

Figure 6:
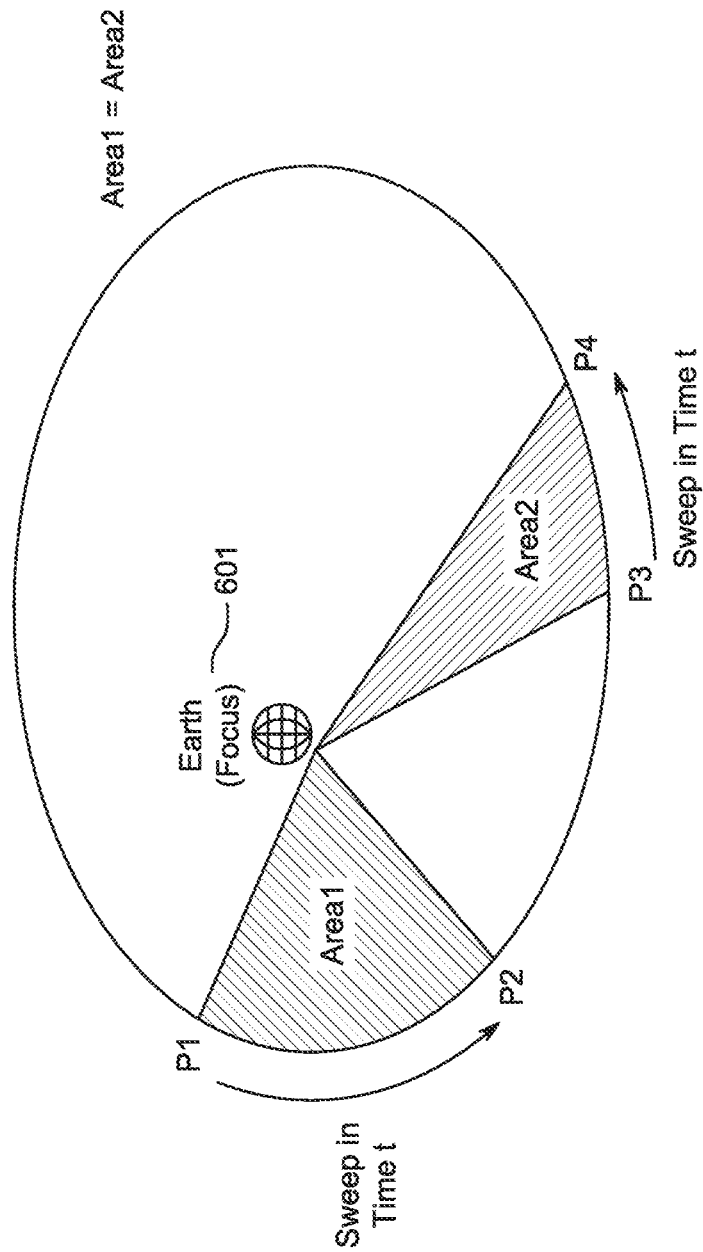
FIG. 6 is a diagram illustrating an example of an elliptical orbit where there is equal areas in equal time according to one or more embodiments.

FIG. 6 is an illustration that shows an example scenario with a satellite at relativistic positions $P_1$ through $P_4$ orbiting the Earth at one focal point 601. Since the areas, Area1 and Area2, swept in the same amount of time t, must be equal per Kepler's $2^{nd}$ law, the velocity of the satellite from $P_1$ to $P_2$ may be higher than the velocity of the satellite from $P_3$ to $P_4$.

For any quantifiable position $P_n$ on the orbit, the area swept from $P_n$ to a neighboring point $P_m$ may be determined. Since the area swept between $P_n$ and $P_m$ is established, the time of the satellite at position $P_m$ can be determined. As shown in FIG. 6, there is an elliptical orbit, whereas for a satellite orbiting earth the orbit may be elliptical or circular. Kepler's law still applies as a circle is an ellipse with zero eccentricity.

In one situation, the RACH opportunities in a NTN network may occur each $5^{th}$ SF on even numbered SFNs. If the WTRU intends to transmit a RACH for the purpose of obtaining RRC connection, the WTRU may estimate the position of the satellite corresponding to that timing occasion as explained above and determine autonomously the TA that is required.

Figure 7:
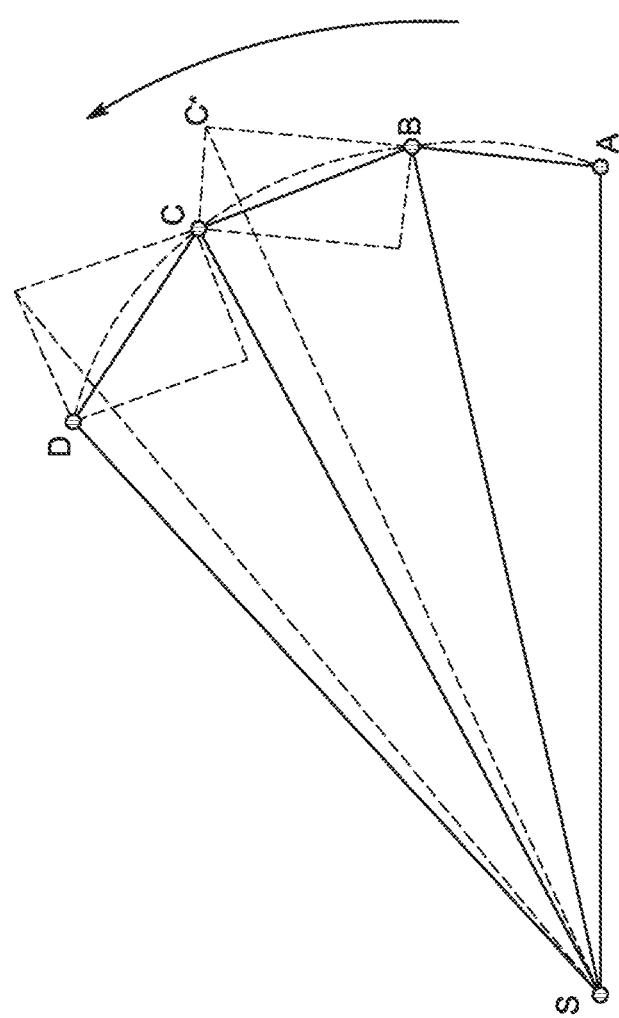
FIG. 7 is a diagram illustrating an example of position estimation according to one or more embodiments.

FIG. 7 illustrates an example where the Earth is at point S, and the satellite starts at point A, following on a trajectory which takes it to B in time interval $\Delta t$. If the satellite at B were not subject to any forces, it would proceed in a straight line to point C* due to centrifugal forces in the next time interval $\Delta t$. The central force Earth, at S, acting on the satellite while at B, points the radius vector down from B towards S. This gravitational force results in a displacement forcing the satellite from C* to C. The area may be estimated by applying Newton's parallelogram law of addition using displacement vectors and the dotted lines as shown in FIG. 7.

In an example using FIG. 7, points A, B, C, D, E . . . are points on an elliptical arc and the Earth is at point S with the satellite following the elliptical orbit with points A, B, C, D, . . . and so on. With Newton's parallelogram law, triangles SAB and SBC* have the same area as they have bases of equal length and the same altitude (i.e., if a perpendicular is dropped from S to the line ABC*). Also, the triangles SBC* and SBC have the same area as well as they have the same base SB and same altitudes since the segment CC* is parallel to SA. Therefore, triangles SAB and SBC may have the same area. In this example, points C, S, A, B and subsequent points D, and so on, lay on the same plane. The straight solid lines of FIG. 7 go away as $\Delta t \rightarrow 0$ and there is a trajectory identical to an ellipse. The dotted line from A to D in FIG. 7 traces an ellipse.

Mathematically, the same conclusion can be reached via derivation. To simplify, polar coordinates may be used and the acceleration vector a of the satellite may be $a=a_r u_r + a_\theta u_\theta$, where $u_r$ and $u_\theta$ are orthonormal and point toward the directions of increasing r and $\theta$.

It may be determined that $$a_r = \frac{d^2 r}{dt^2} - r\left(\frac{d\theta}{dt}\right)^2 \text{ and } a_\theta = \frac{1}{r}\frac{d}{dt}\left(r^2 \frac{d\theta}{dt}\right).$$

In a central force field, by definition, the acceleration is entirely radial and thus $a_\theta=0$. This leads to the simplification $$r^2 \frac{d\theta}{dt} = k,$$

where k is a constant. The area swept out by the radius vector in a time interval $\Delta t$ may then be calculated. Based on Kepler's laws, the path of the satellite with $\theta$ may be parameterized and hence $$\text{Area} = \int\int r\,dr\,d\theta = \frac{1}{2}\int r^2 d\theta.$$

Since θ is a function of time, Area $$A = \frac{1}{2}\int_{t}^{t+\Delta t} r^2 \frac{d\theta}{dt} dt = \frac{k*\Delta t}{2}.$$

This is identical for any time interval Δt as the problem is parameterized with θ.

Thus, after performing downlink synchronization, a WTRU may estimate the TA required for the uplink transmission of any specific RACH opportunity knowing the {SFN, SF} on which the RACH message is to be transmitted.

To address a large payload size of the fixed bitfield for an extended TA command, the WTRU may determine the bitfield size of the extended timing TA, which may be adaptively adjusted to the type of the airborne or spaceborne vehicle (i.e., satellite) without explicit signaling from a base station (e.g., gNB) on the vehicle.

Figure 8:
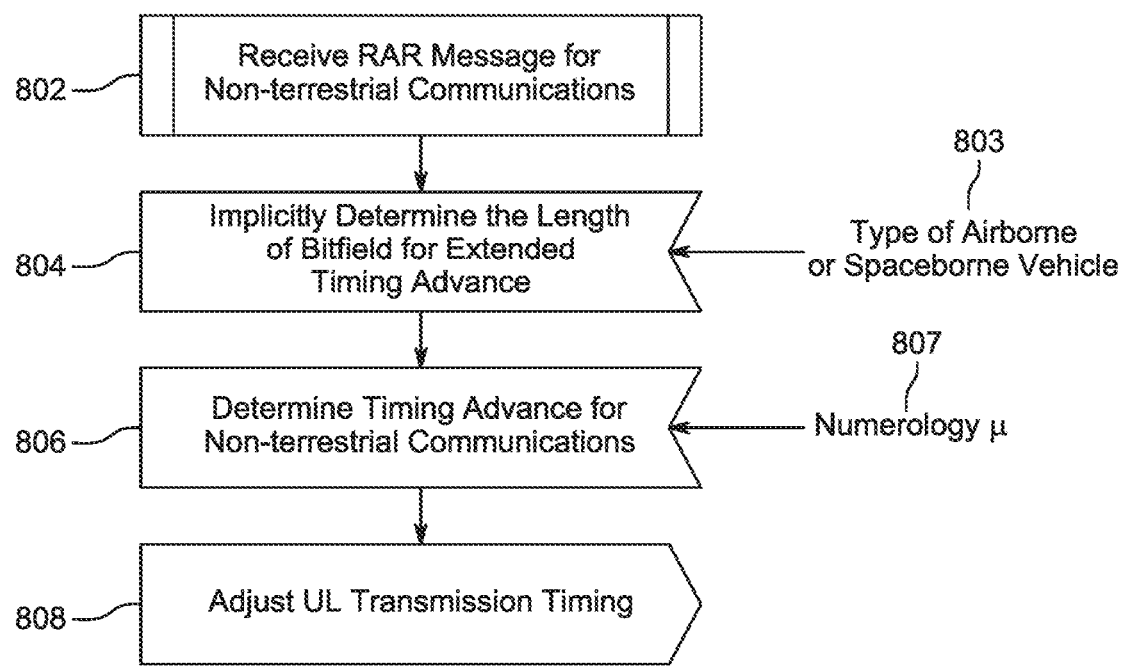
FIG. 8 is a diagram illustrating an example WTRU procedure for bitfield size determination for a timing advance command for non-terrestrial network communications according to one or more embodiments.

FIG. 8 shows a WTRU procedure for bitfield size determination for the TA command for NTN communication. Generally, at 802 a WTRU may receive a RAR message for non-terrestrial communication. At 804 the WTRU may implicitly determine the length of bitfield for extended TA. At 803, the WTRU may determine the bitfield size using the type of the airborne vehicle, such as a High Altitude UAS Platforms (HAPs), or spaceborne vehicles (e.g., Satellites (LEO, MEO, GEO)). As discussed herein, the term vehicle and satellite may be interchangeable. The WTRU may know the type of airborne or spaceborne vehicle based information received through signaling in system information, or higher layer signaling, and/or estimated by the WTRU using the round trip time measurements, or derived based on parameters in the system information. At 806, based on the bitfield length, the WTRU may determine the TA for NTN communication, which may be based in part on the numerology u as shown at 807. At 808, based on one or more of the previous steps, the WTRU may adjust the UL transmission timing.

In an example, the bitfield for the GEO satellites may be 20 or 21 bits while for the MEO and LEO satellites the bitfield may be smaller values to lower the signaling overhead.

In an example, the WTRU may assume the bitfield size for a TA command for the MEO satellites is 19 bits. In this case, the range of $T_{EA}$ could be {0, 1, . . . , 345600}. The maximum supported timing alignment for subcarrier spacing of 15 kHz is 180 msec: $N_{TA,MEO}$=345600·16/30,720,000=180 m sec.

In an example, the WTRU may assume the bitfield size for TA command for the LEO satellites is 17 bits. In this case, the range of $T_{EA}$ could be {0, 1, . . . , 96000}. The maximum supported timing alignment for subcarrier spacing of 15 KHz is 50 msec: $N_{TA,LEO}$=96000·16/30,720,000=50 m sec.

A lookup table may be defined where the size of the TA bitfield in the RAR message is given in terms of the type of the satellite. A WTRU, based on the type of the satellite, where the WTRU has already received the information about the satellite type from the network in the form of system information, may retrieve the size of the TA bitfield from the lookup table. An example lookup table is shown in Table 4, where it is assumed that there are three types of satellites (airborne/spaceborne). In practice the number of satellite types may be more. The lookup table should be predefined and both the network and WTRUs should have a common understanding of the lookup table.

TABLE 4

Example of a lookup table for size of TA bitfield in terms of satellite type

| Satellite type | Size of TA bitfield (bits) |
| --- | --- |
| GEO | 21 |
| MEO | 19 |
| LEO | 17 |

In one situation TA may be estimated during handover. Generally, handover may be network controlled, though the WTRU may assist in providing measurements. There may be two types of handover from the network perspective: 1) measurement based handover, and 2) service based handover. In the service based handover, the WTRU may not report a measurement on a candidate target and may not assist in selecting the candidate target. Further, the source cell may decide to handover the WTRU to any suitable target cell based on internal algorithms for reasons such as load balancing or to overcome temporary overload at the source cell. At the time of a handover, since the WTRU may not have measured the target cell, the WTRU must obtain synchronization and cell timing of the target just before transmitting the uplink access message to the target.

Alternatively, in the measurement based handover, the source base station may receive one or more measurements for a candidate target cell from the WTRU, and the source cell may estimate the necessity to perform a handover. If a measurement is reported by a WTRU on a target cell, the target cell's DL timing may be obtained by the WTRU since reference signal position may only be known after synchronization is obtained. Also, the source cell may need to configure measurement gaps and allow sufficient time for the WTRU to make measurements on the candidate targets. In these scenarios, it may be possible for the WTRU to also acquire system information of the target cell.

Figure 9:
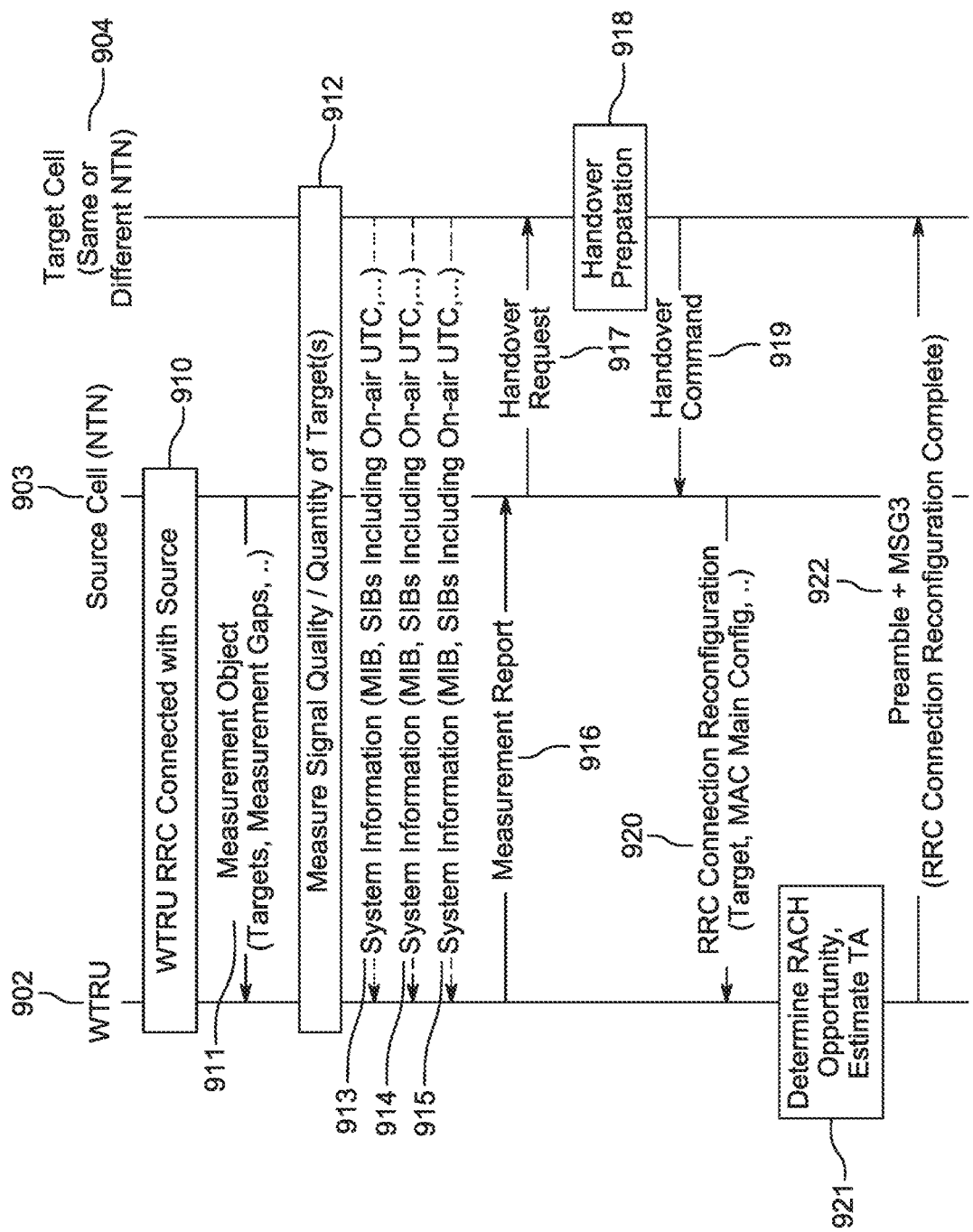
FIG. 9 is a diagram illustrating an example procedure for determining TA prior to RACH during handover according to one or more embodiments.

FIG. 9 is a diagram that illustrates an example of determining the TA prior to RACH during handover between the entities of a WTRU 902, source cell 903 of a NTN, and target cell 904 that may be the same or different NTN. In this example, the source cell and the target candidate cells may be hosted by two different NTN. If the target cell broadcasts the UTC formatted absolute on-air time in a SIB, corresponding to the {SFN, SF} carrying that SIB, the WTRU may estimate the propagation delay between itself and the target satellite per procedures detailed discussed herein. Handovers may be accomplished via dedicated preambles with the target reserving a preamble for the incoming WTRU so that contention resolution is completely avoided. Handovers are also possible with contention based preambles. Regardless of the choice of a dedicated or contention based preamble, the preamble is transmitted on an allowed RACH opportunity. If a dedicated preamble is assigned by the target, there is no contention for that preamble at the following few RACH opportunities as the target has reserved the preamble for the intended incoming WTRU. If a dedicated preamble is not assigned by the target, the WTRU may select a preamble after reading system information from the target containing parameters relating to RACH procedure. The process of reading system information just prior to handover, after receiving handover command (e.g., RRC CONNECTION RECONFIGURATION) from the source may further delay the handover completion. Thus handovers may not be performed with contention based preambles. When using dedicated preambles, though contention and collision may be avoided, the WTRU connecting to a target satellite may still experience high Doppler for reasons explained earlier owing to high relative velocities between the satellite and the WTRU.

As shown in FIG. 9, initially at 910 a WTRU 902 may be RRC connected with a source cell 903. At 911, the WTRU 902 may require the facilitation of measurement gaps from the source cell 903 or may autonomously choose to receive them without the necessity for measurement gaps from the source cell 903. At 912, the WTRU 902 may measure the signal quality and/or quantity of targets (i.e., target cell 904). At 913, 914, and 915 the WTRU 902 may receive the SIB containing the UTC formatted absolute on-airtime of the {SFN, SF} carrying the SIB even in cases of handover. The WTRU 902 may then estimate the propagation delay to the target satellite using one or more SIB receptions from the target, and then measure and estimate the propagation time to the same satellite at a future time instance using techniques discussed herein. At 916, the WTRU may send a measurement to the source cell 903, which in turn at 917 may send a handover request to the target cell 904. At 918 the target cell 904 may perform handover preparation, then the target cell 904 may send at 919 a handover command to the source cell 903. At 920, the WTRU 902 may receive the handover message from the source, for example RRC CONNECTION RECONFIGURATION containing parameters determined by the candidate target cell 904. The WTRU 902 may read the dedicated preamble selected by the candidate target cell, if any. Otherwise, the WTRU 902 may randomly choose a preamble using MAC protocol methods. At 921, the WTRU 902 may determine the RACH opportunity and may form a proportional tuple of the preamble as described herein, and then at 922 may transmit at a RACH opportunity by applying a TA, calculated earlier, applicable for the transmission RACH opportunity. Determining the TA prior to RACH during handover may help avoid issues with initial access and suppress any frequency offset that may exist and improves handover success rate.

Where the WTRU performs semi-autonomous (i.e., WTRU assisted TA) regulated TA, the WTRU may have access to GPS or other global navigation satellite system (GNSS) services. Based on these services, the WTRU may be able to obtain its own location information through these systems and use it to estimate the timing offset for adjusting its PRACH transmission prior to receiving a TA command from a base station (i.e., a gNB). In this way, large variations of the RTT inside the footprint of the satellite beam may be addressed by using the estimated timing offset by the WTRU while the residual uplink timing alignment may be achieved through the RACH process. Generally, the timing offset may be estimated by the WTRU and applied to the PRACH transmission. The RAR may provide the TA. The timing offset estimated by the WTRU may be considered to be an initial coarse estimate, and the timing advance TA provided with the RAR may be considered to be a fine estimate. The total (i.e., effective) timing advance may be obtained by combining the coarse timing offset estimate by the WTRU, with the finer TA provided by the gNB in the RAR. As discussed herein, an estimated TA, predicted TA, or a TA determined prior to a PRACH may be interchangeable with the term timing offset.

The footprint of the satellite may be divided to smaller sub-regions where for each sub-region the variation of the RTT is limited to a smaller value, which is equivalent to the smaller footprint as shown in FIG. 4. For example, the size of sub-regions may be such that the variation of the round-trip time is limited to 0.1 ms which is similar to the CP length and guard time in NR PRACH Format 0, or limited to 0.5 ms which is smaller than the CP length and guard time in NR PRACH Format 3. In this way, the WTRU, based on the knowledge of its location and knowledge of the location or trajectory of the satellite, may adjust the timing of the transmission of its PRACH such that the gNB receives the PRACH within the allocated subframe/subframes/slots for the configured PRACH time resource.

In a case where the WTRU did not apply any timing offset for its PRACH transmission, the gNB may receive the PRACH outside the WTRU's allocated PRACH time resource. This may result in the PRACH detection failure as well as interference to other uplink transmissions.

Figure 10:
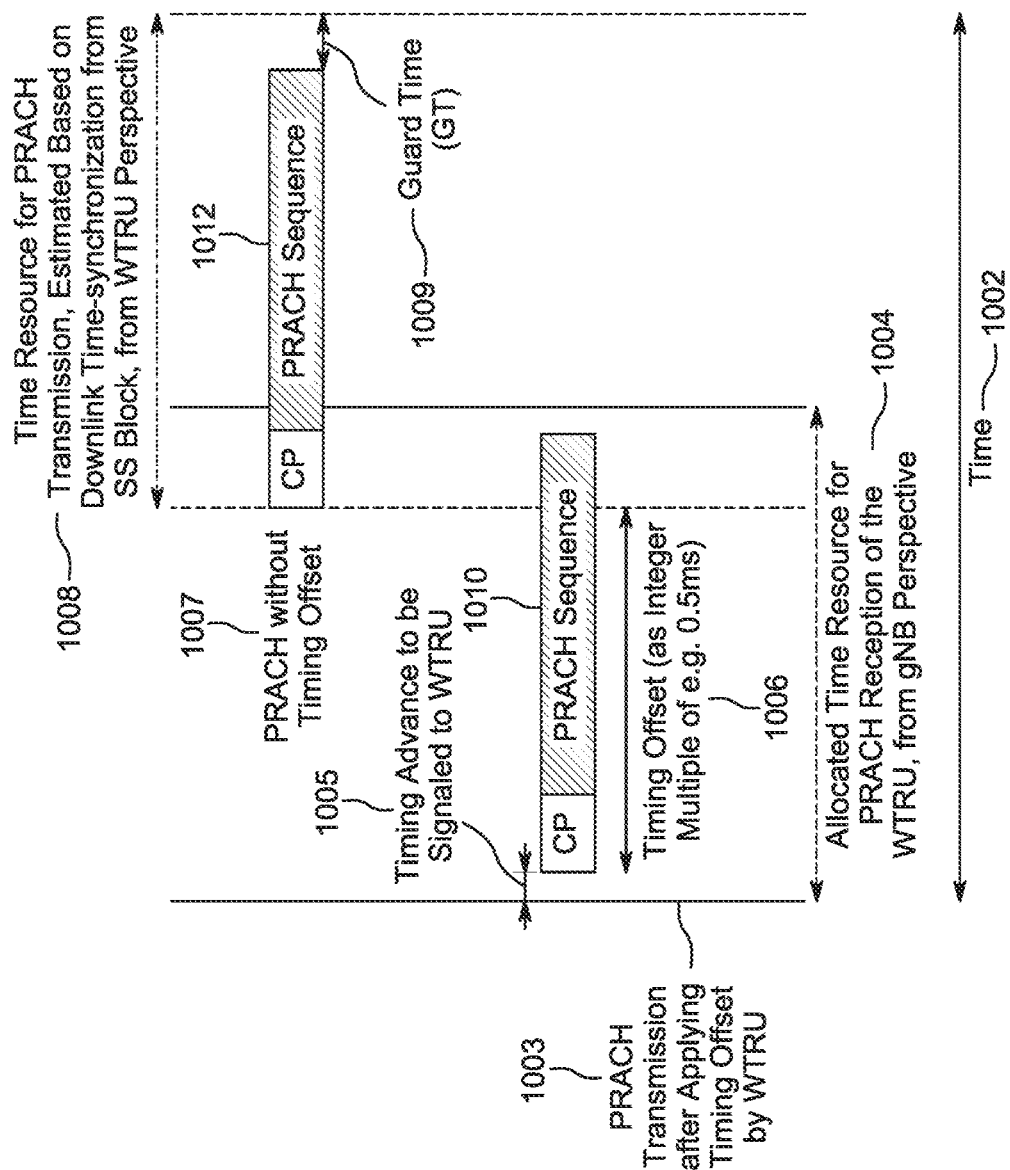
FIG. 10 is a diagram illustrating an example of a WTRU applying a timing offset before a PRACH transmission according to one or more embodiments.

FIG. 10 shows a WTRU applying a timing offset before a PRACH transmission. 1008 shows the time resource for a PRACH transmission, estimated based on downlink time synchronization from the SS block, from the WTRU perspective. 1007 shows the PRACH 1012 without timing offset, with the included guard time 1009 within the time resource 1008. The WTRU may derive the timing offset 1006 based on the knowledge of its location and knowledge of the location (or trajectory) of the satellite and may apply it to the PRACH transmission, resulting in 1003 start for PRACH 1010 including the TA 1005 that can be signaled to the WTRU. This way the PRACH transmission will be received on the WTRU's allocated PRACH time resource 1004 from the gNB perspective. This will enable the gNB to correctly detect the PRACH and estimate the remaining TA which may be signaled to the WTRU in the RAR message.

Figure 11:
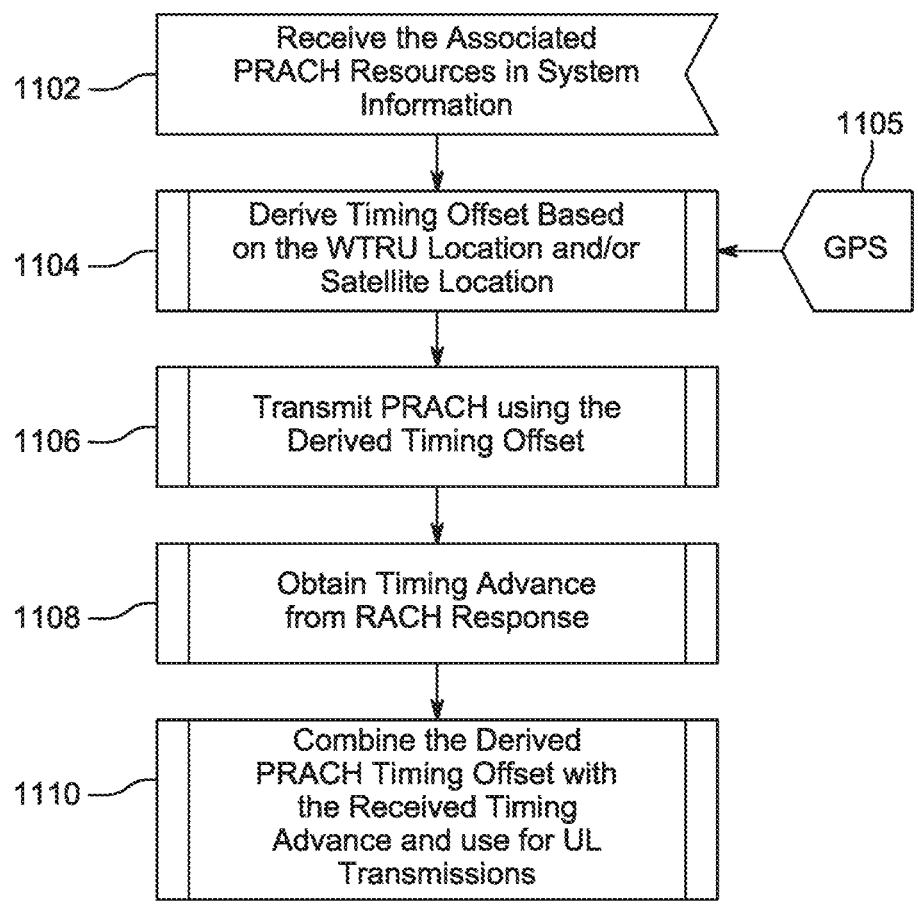
FIG. 11 is a diagram illustrating an example procedure of determining a timing advance according to one or more embodiments.

FIG. 11 is a flow chart that shows an example WTRU procedure for network-transparent timing offset in transmission of a PRACH, implemented by a WTRU based on location information. At 1102 a WTRU may receive associated PRACH resources in system information. At 1104 the WTRU may derive the timing offset based on the WTRU location and/or satellite location. In some cases, at 1105 the location information may come from a GPS. At 1106, the WTRU may apply the derived timing offset to the PRACH transmission. At 1108, the WTRU may obtain the TA from the RACH response. At 1110, the WTRU may combine the derived timing offset with the received TA and use it for UL transmissions.

Figure 12:
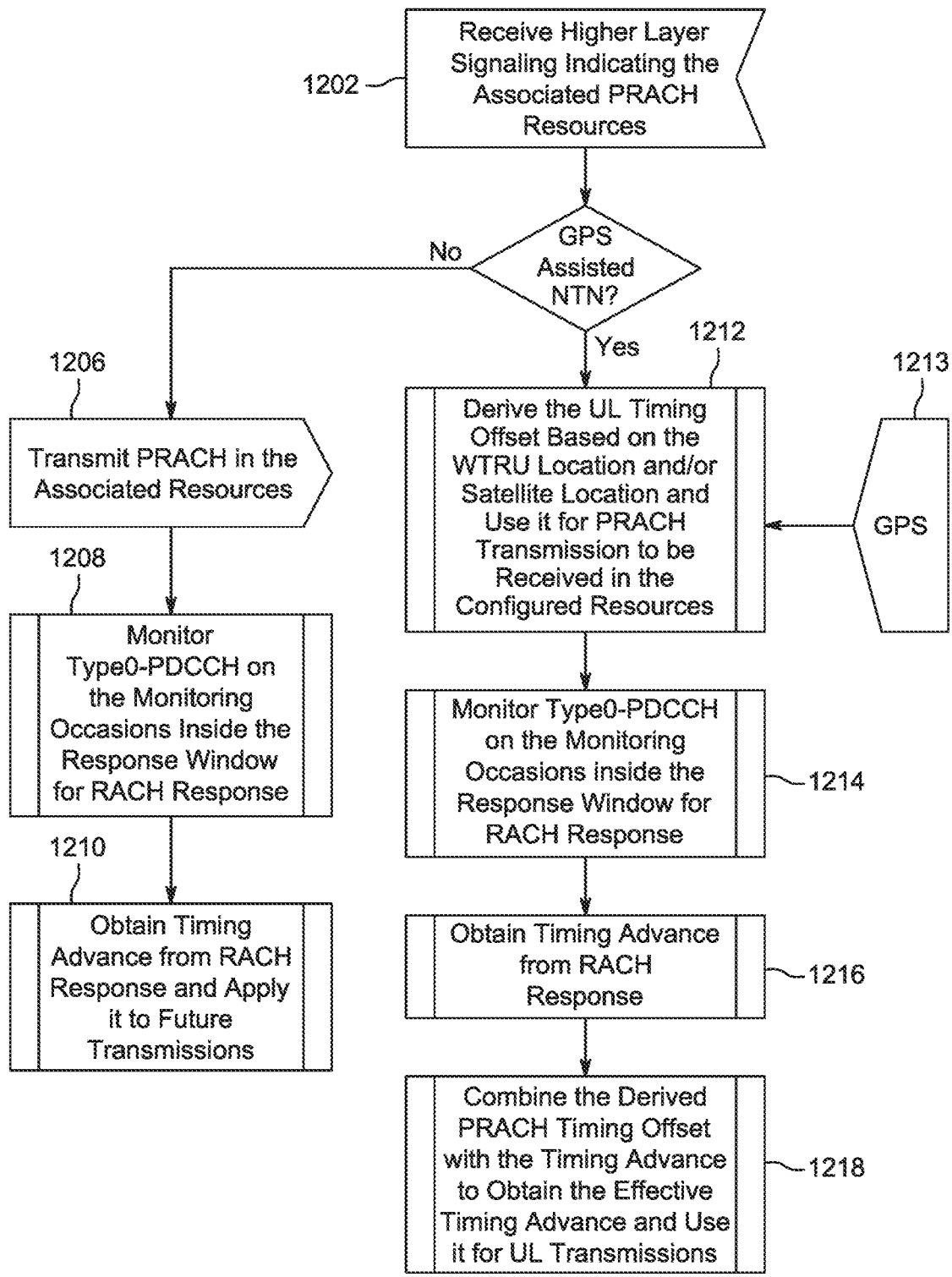
FIG. 12 is a diagram illustrating an example of a WTRU procedure for a network-transparent timing offset in transmission of a PRACH based on location information according to one or more embodiments.

FIG. 12 is a flowchart that shows an example WTRU procedure for network-transparent timing offset in transmission of a PRACH, implemented by a WTRU based on location information. At 1202, a WTRU may receive higher layer signaling that indicates associated PRACH resources. In one scenario, there may not be a GPS assisted NTN, and at 1206 the WTRU my transmit PRACH in the associated resources. The WTRU may then monitor type0-PDCCH on the monitoring occasions inside the response window for RACH response. Then at 1210, the WTRU may obtain the TA from the RACH response and apply it to future transmissions. In one scenario, there may be a GPS assisted NTN, and at 1212 the WTRU may derive the uplink timing offset for a PRACH transmission. The estimation of the timing offset for PRACH transmission by the WTRU may be based on one or more of the following: WTRU location information (e.g., GPS or other GNSS services); satellite location/ trajectory (e.g., higher layer parameters); distance of the non-terrestrial gNB from Earth; angle of elevation of the satellite; and/or boundaries of the satellite beam footprint. The WTRU may apply the estimated timing offset to the PRACH transmission. Upon reception of the PRACH, the gNB may estimate the uplink timing and RTT for each WTRU based on the assumption that the transmission was done in the allocated PRACH time resource by the WTRU, and may send its estimated TA together with scheduling grant information back to the WTRU in an RAR message. At 1214, the WTRU may monitor a type0-PDCCH on the monitoring occasions inside the response window for the RAR response, and at 1216 the WTRU may obtain the TA from the RAR response. At 1218, the WTRU may combine the received TA from the RAR message with the timing offset that it derived based on the information listed above and used for PRACH transmission to obtain the actual TA (i.e., effective TA) which may be used by the WTRU for subsequent uplink data and control transmission.

Figure 13A:
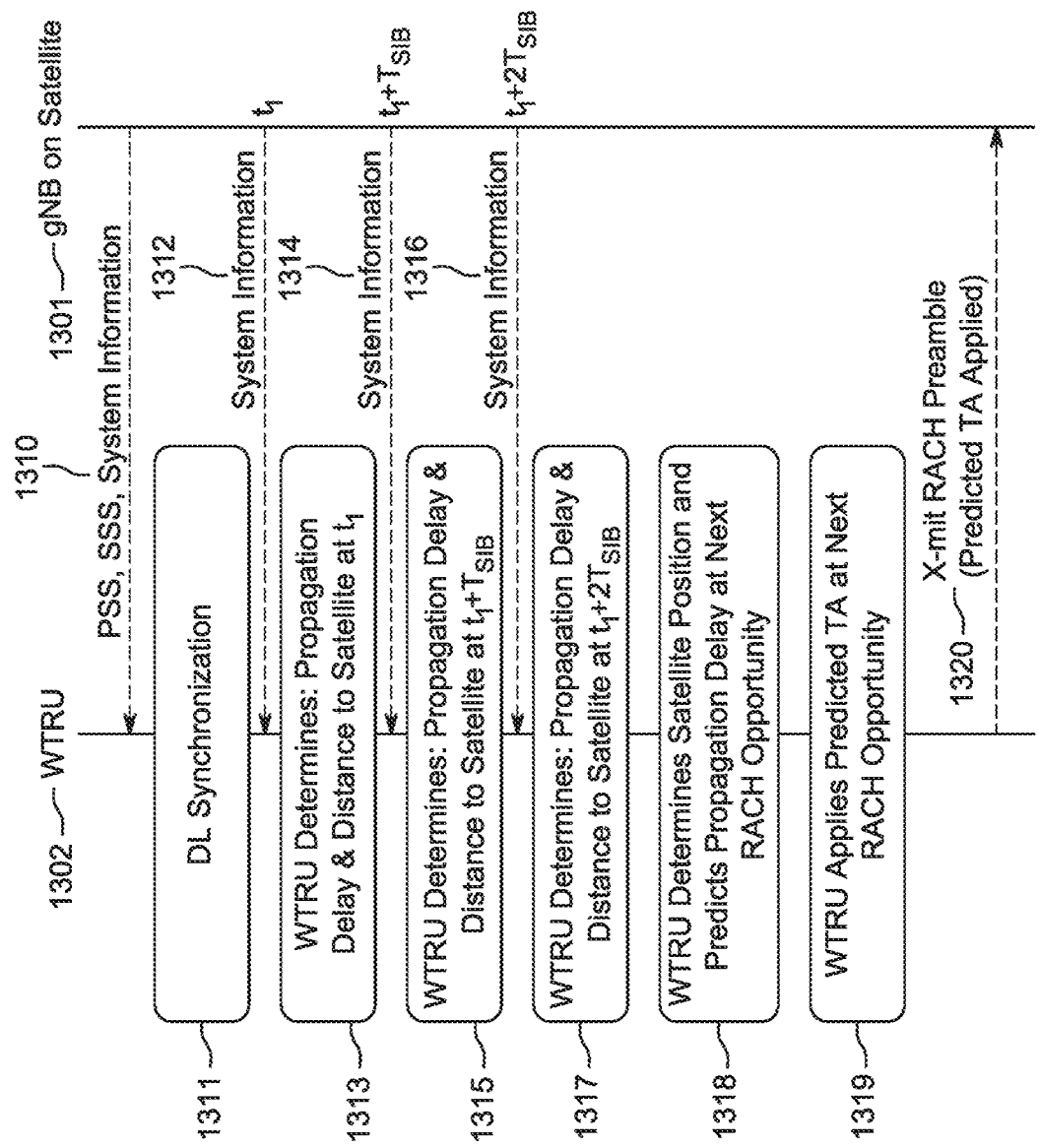
FIG. 13A is a diagram illustrating an example of estimating timing advance according to one or more embodiments.
Figure 13B:
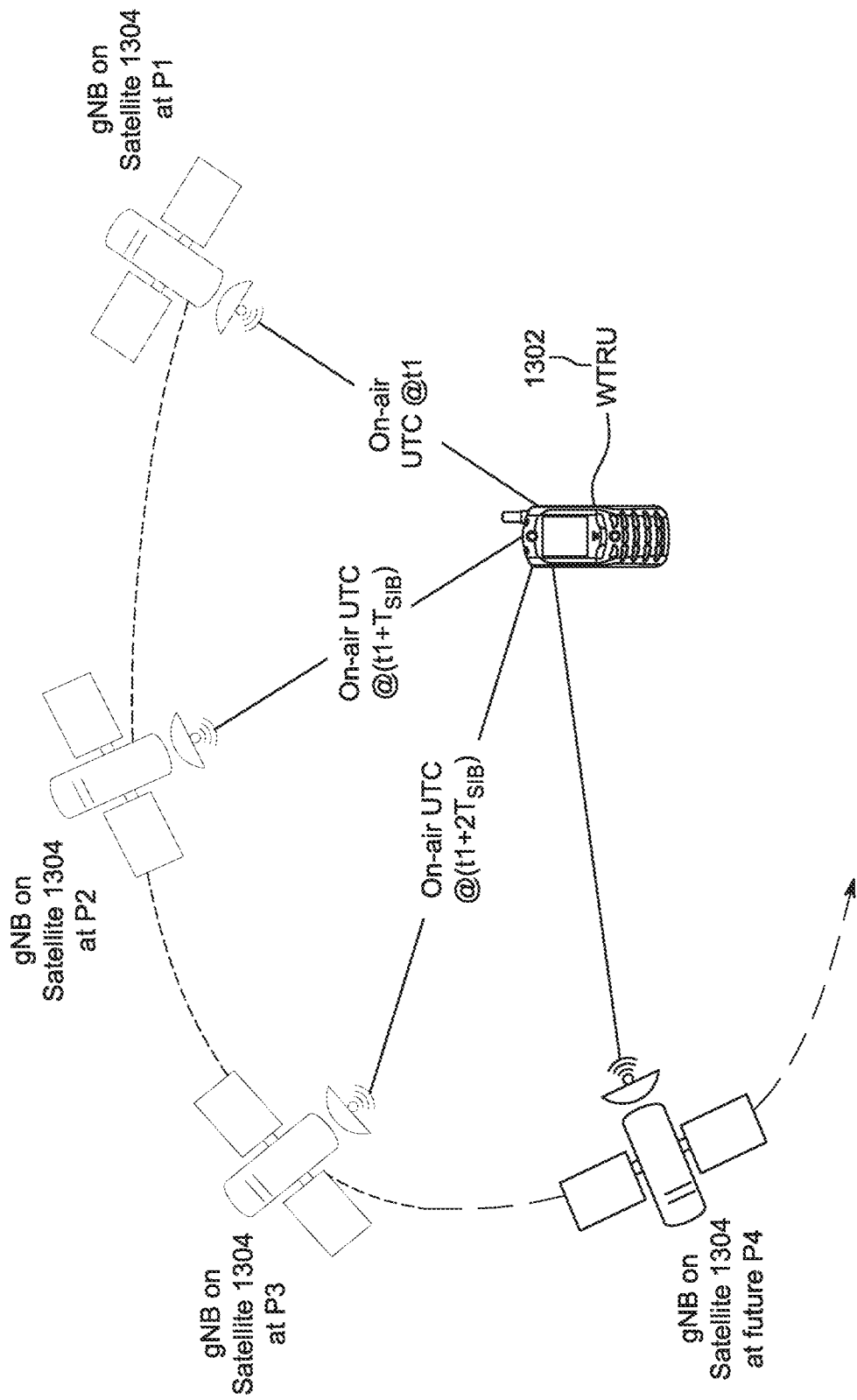
FIG. 13B is a diagram illustrating an example of a satellite relative to a WTRU for estimating timing advance according to one or more embodiments.

FIGS. 13A and 13B are diagrams that illustrate an example of determining the timing offset, where FIG. 13A shows a communication interaction between a WTRU 1302 and a gNB on a satellite 1301, and FIG. 13B shows a path of the satellite 1301 as communicates with the WTRU 1302. At 1310 a WTRU 1302 may receive a PSS, SSS, and/or system information from a base station (i.e., gNB on a satellite 1304) that may be in a an orbit around the Earth. At 1311 the WTRU 1302 performs DL synchronization based on the received information. At 1313 the WTRU 1302 receives system information while the satellite 1301 is as position P1 and determines the propagation delay and distance to the satellite 1301 at time $t_1$. At 1315 the WTRU receives system information 1314 from the satellite 1301 at position P2 at time $t_1+T_{SIB}$, and determines propagation delay and distance to satellite. At 1317 the WTRU 1302 receives system information from the satellite 1301 which is at position P3 at time $t_1+2T_{SIB}$, and determines the propagation delay and distance to the satellite. This process of receiving system information and determine the propagation delay and distance to satellite 1301 at increasing times may repeat additional times, which may result in a more accurate picture of the satellite's 1301 movement and ability to predict its position at a future time. At some future point in time the satellite 1301 might be in a position P4. At 1318 the WTRU 1302 may determine the satellite position (e.g., based on techniques described herein) and predict the propagation delay at the next RACH opportunity based on the measurements and information gathered so far. At 1319 the WTRU 1302 may apply the predicted TA at the next RACH opportunity for the satellite 1301 at position P4, and transmits the RACH preamble using the predicted TA (i.e., timing offset). This process may continue for other types of transmission once a connection is established, for example for managing the TA that may be needed during future data transmission.

In one case, open loop RACH transmission may be at fixed power. In LTE and NR, the base station may expect to receive a RACH preamble at a specified target power level. To facilitate this, the base station may transmit two parameters to the WTRUs over system information. One parameter may inform the WTRU of the actual transmission power $P_{TX\_RS}$ (dBm), of the reference signal, per symbol per antenna port, and the other parameter may inform the WTRU of the expected target RACH power level, $P_{RX\_RACH}$ (dBm), at the base station.

If the received power of the reference signal is $P_{RX\_RS}$ (dBm) at the WTRU, the WTRU may estimate the pathloss as $(PL=P_{TX\_RS}-P_{RX\_RS})$ dB. If the pathloss is PL and the expected power of RACH at the base station is $P_{RX\_RACH}$, the WTRU may transmit at $(P_{TX\_RACH}=P_{RX\_RACH}+PL)$ dBm.

The base station may expect to receive all WTRUs at the same power level to ensure the dynamic range of the RF components at the receiver, such as a Low noise amplifier (LNA), are not distorted. The receiver may implement any algorithm and may apply a diversity of schemes to decode single user and multi-user transmissions.

If the WTRUs are received by the base station at drastically differing power levels, the receiver may use this to perform successive interference cancellation (SIC). By decoding the best user and subtracting out that user, the base station may decode and subsequently subtract out the $2^{nd}$ best and so on until either the last user is decoded or the receiver chooses to stop processing due to timing budgets. To enable this, the WTRUs must transmit such that they are received at unequal power levels.

If the WTRUs do not transmit RACH by compensating for the pathloss and rather transmit RACH at a fixed power level, owing to a probabilistically uniform distribution of the distances of the WTRUs from the base station, the RACH received from the WTRUs may have differing power levels that the base station may subsequently use to perform SIC and decode.

In one situation, the WTRU may read the parameter $P_{CMAX}$ from the system information if it is signaled from the base station. $P_{CMAX}$ refers to the maximum transmit power for any WTRU in the cell. If $P_{CMAX}$ is not broadcast, then the WTRU may set $(P_{CMAX}=P_{MAX})$ where $P_{MAX}$ is the WTRU's maximum power corresponding to its power class. At the RACH opportunity, the WTRU may transmit the RACH at $P_{CMAX}$ without any pathloss compensation. The WTRU may transmit a proportional tuple of CAZAC sequence as described earlier and apply a predetermined TA using methodologies detailed earlier after reading the absolute on-air time of the SIB transmitting the UTC formatting the {SFN, SF}.

In one case, concurrent data and control information may be sent in a given random access transmission. In a terrestrial scenario, the coverage area may be limited to a radius of tens of kilometers, and thus one-way propagation time may be in the order of tens of microseconds. For example, a cell with a radius of 3 kilometers may see a maximum propagation delay of only 10 microseconds. Incidentally, for the same example, the maximum delay in receiving a signal from the base station at two arbitrary WTRUs, one very close to the base station, and the other at cell coverage edge, may also be 10 microseconds.

Figure 14:
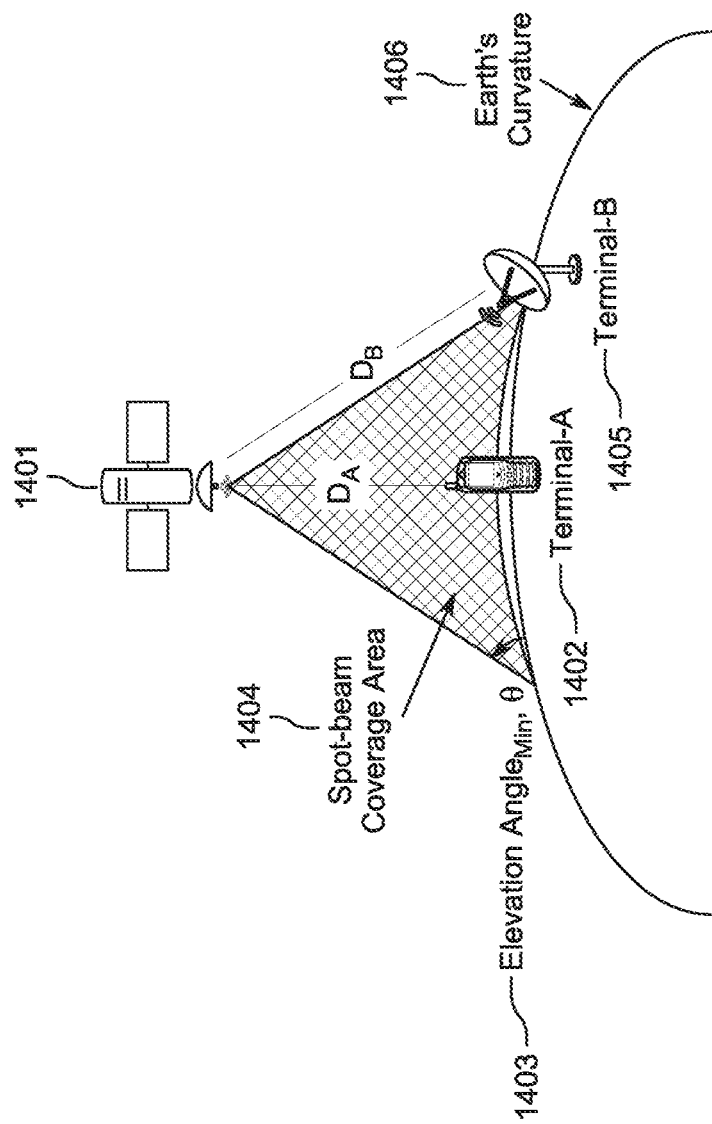
FIG. 14 is a diagram illustrating an example of the variance in propagation delay inside a spot-beam according to one or more embodiments.

In a NTN, the base station may be on an orbit several hundreds to several thousands of kilometers above earth. For example, if there is a NTN base station on a circular orbit 3000 kilometers above earth, the one-way propagation delay may be as high as 10 milliseconds, one thousand times longer than the terrestrial example. As the NTN base station's distance from earth increases to geo-synchronous orbits (GSO, GEO), the one-way propagation delay may be as high as 120 milliseconds. Further, in the case of satellite systems, the variance in propagation delay may be contingent on the minimum elevation angle supported in the spot-beam. FIG. 14 is a diagram that illustrates an example of propagation delay, where Terminal-A 1402 is at the NTN's (i.e., network of the satellite 1401) nadir and Terminal-B 1405 is at a spot-beam edge. The Earth's curvature is shown at 1406, and the spot beam coverage area of the satellite 1401 on the Earth's surface may be 1404. The propagation delays to Terminal-A 1402 and Terminal-B 1405 are marked as $D_A$, $D_B$ respectively. If the θ=45° and the altitude of the satellite is 3000 km at nadir, then it may be determined that Terminals A 1402 and B 1405 are located 3000 km and approximately 4243 km away from the satellite respectively. Thus, propagation delay $D_B>D_A$.

For the uplink frames to arrive frame-aligned at the satellite 1401, Terminal-B 1405 must transmit $(D_B-D_A)$ time units in advance of Terminal-A 1402. Further, in a link with propagation delay $D_X$, if a specific transmission was received in error, the retransmission can occur at the minimum only after ($2*D_X$) time units after initial transmission. Propagation delay may be a component that cannot be compensated in any communication link. However, it may be possible to optimize procedures to reduce overall latency in a bidirectional link. For example, if it would take $D_X$ time units for each transmission to arrive at a receiver, it may be possible to piggyback additional information onto existing transmissions thereby circumventing some sequences.

Figure 15:
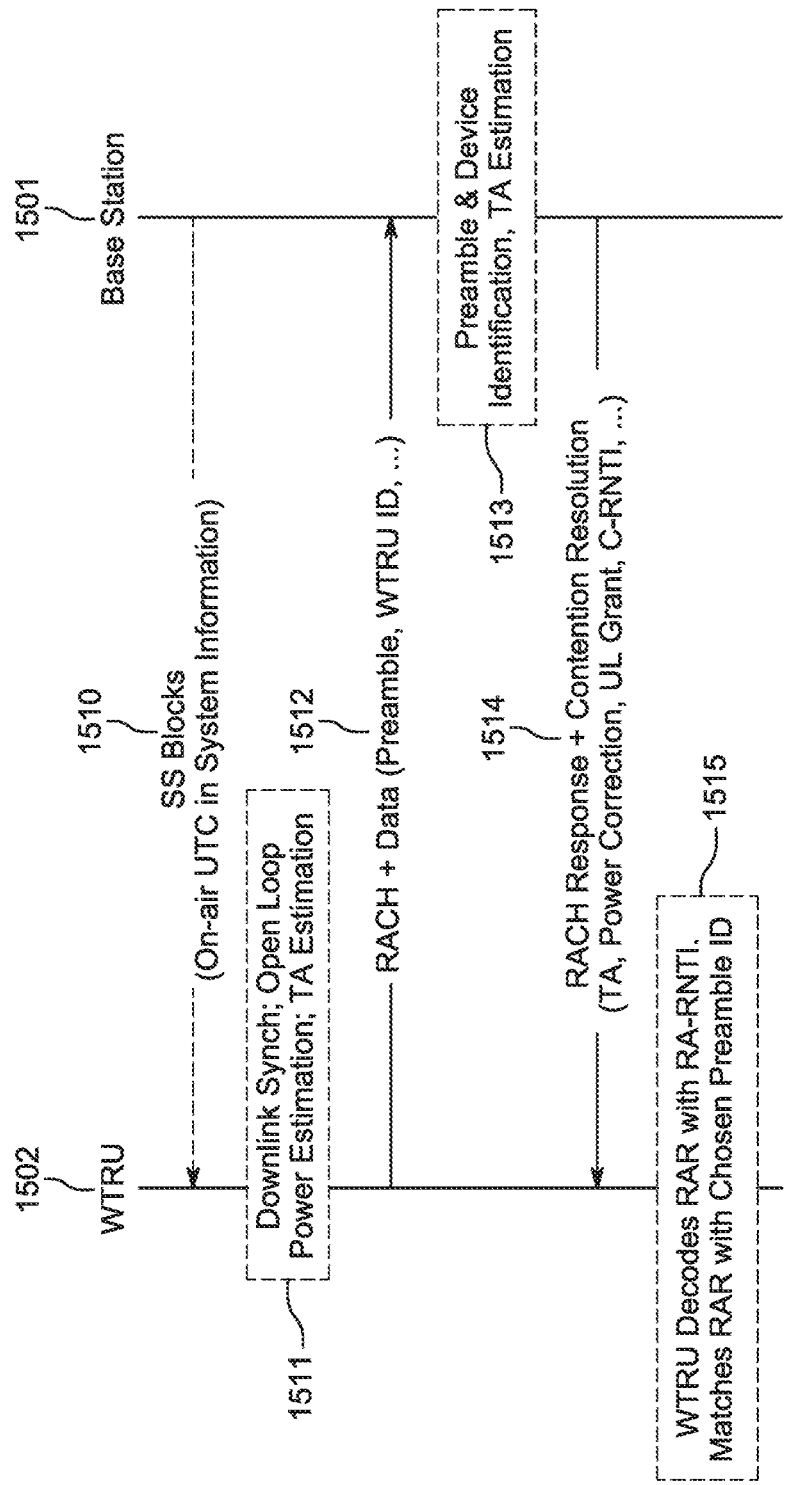
FIG. 15 is a diagram illustrating an example procedure of an optimized RRC connection establishment from IDLE according to one or more embodiments.

FIG. 15 is a flow chart illustrating an example procedure with just two message sequences that accomplishes the same as the flow chart in FIG. 3 which uses four message sequences. Reducing the current contention based RACH sequence flow to a minimum may be desired for the reasons discussed herein. At 1510, the base station 1501 may send system SS blocks (i.e., on-air UTC in system information) to the WTRU 1502. At 1511, the WTRU 1502 may perform downlink synchronization, open loop power estimation, and TA estimation. At 1512, the WTRU may send RACH+data (e.g., preamble ID, WTRU ID, etc.) to the base station 1501. At 1513, the base station may receive and process the preamble ID and WTRU ID, and TA estimation. At 1514, the base station 1501 may send the RACH response+contention resolution (e.g., RA, power correction, UL grant, CR-RNTI, etc.) to the WTRU 1502. At 1515, the WTRU may decode the RAR and RA-RNTI and match the RAR with a chosen preamble ID. Each step my be based on one or more of the steps that precede it.

Figure 16:
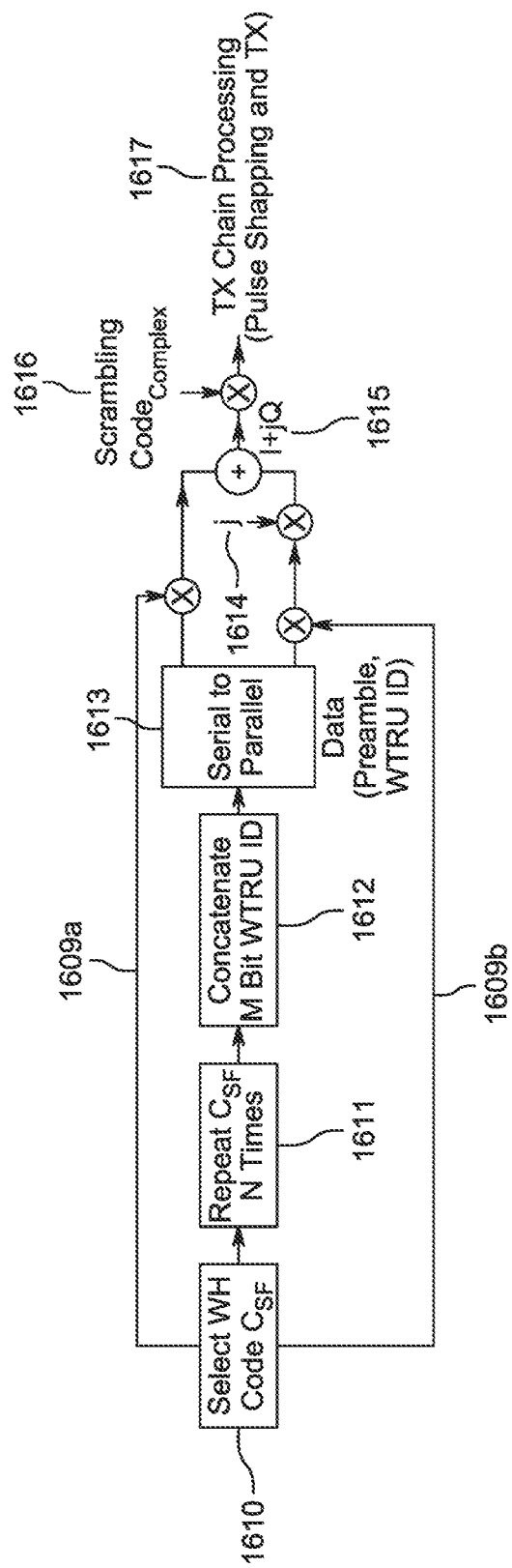
FIG. 16 is a diagram illustrating an example of one phase user and preamble detection according to one or more embodiments.

FIG. 16 is a diagram that illustrates an example where there may be one or more mechanisms for combining the procedures for preamble detection and user identification. The preamble and the message part may be jointly transmitted to the base station as a single message to minimize the number of signaling instances for completing the RACH flow. The data part may be one or many of the following though other parameters may not be precluded: WTRU Identity, Establishment cause, RRC procedure code, MAC Control Element (MAC CE) for uplink synchronization. The RRC procedure code may indicate one of several possible messages; for example, RRC CONNECTION REQUEST, RRC CONNECTION RECONFIGURATION COMPLETE, RRC CONNECTION REESTABLISHMENT REQ. During loss of UL synchronization, the WTRU may transmit its C-RNTI to the base station via a MAC CE.

At 1610, the WTRU may select an orthogonal code such as Walsh Hadamard (WH) code $C_{SF}$ of a given length L, and repeat N times at 1611 before concatenating with a WTRU ID of length M bits to form the RACH packet at 1612. At 1613, the RACH packet may be split into two paths via a serial to parallel convertor before the two paths are spread by the same WH code $C_{SF}$ selected earlier via 1609a and 1609b. At 1615 there is the output of the adder, where a complex QPSK symbol may be generated by multiplying the lower path by j 1614 and resulting in the QPSK signal (I+jQ). At 1616, the QPSK symbols may be scrambled by a long scrambling code before being passed through the TX chain at 1617 where pulse shaping may occur. The long scrambling code may or may not have the same length as the RACH packet. If necessary, the long scrambling code may repeat within the duration of a RACH packet. The length of the long scrambling code may equate to the entire RACH frame. The long spreading code methodology, in addition to minimizing the collision probability, may also be optimal when used in an FEC coded system as it randomizes interference. Using this procedure, it may be forced to the equivalent of Gaussian noise.

The base station may transmit, as part of system information, RACH related parameters that are to be used for UL contention based access. The superset of P WH codes, the set of $C_{SF}$ [0 to P−1], that can be used for channelization may be indicated via system information. The length of a specific WH code, or alternately the spreading factor, may differ compared with other WH codes among the set of WH codes signaled in system information. In such cases, the WH repeat factor N to be used corresponding to the $C_{SF}$[i]; 0≤i<P−1 may also be indicated.

The long uplink scrambling codes may be gold sequences. Indices to the set of Q long scrambling codes, $SC_{Complex}$, may also be broadcast by the base station in the system information. In an alternative option, the set of Q long uplink scrambling codes may be implicitly derived by the WTRU by relating to the scrambling code used by the base station on the downlink. In one example, the set of available gold sequences used by the network may be split into S distinct groups of T sequences each. The base station may select one group of T sequences or may be provisioned by one group of T sequences from the set S at system startup. The first gold sequence in the set of T sequences of a given group may be the primary scrambling code that is used by the base station on the downlink, whereas the remaining (Q=T−1) scrambling codes within the same group may be implicitly understood to be the set of Q long scrambling codes that can be applied on the uplink for RACH transmissions. The WTRU may choose one long scrambling code from the set Q uniformly randomly.

Linear minimum mean square error (MMSE) detectors may significantly boost the achievable performance in a CDMA access scheme. QPSK modulation may be applied since a MMSE receiver's performance may degrade when system loading is high. If instead of BPSK, QPSK modulation is applied, the loading on the system may be halved, assuming the same FEC code rate. In the TX chain, the WTRU may perform pulse shaping of the Real and Imaginary parts before transmitting on the carrier.

Figure 17:
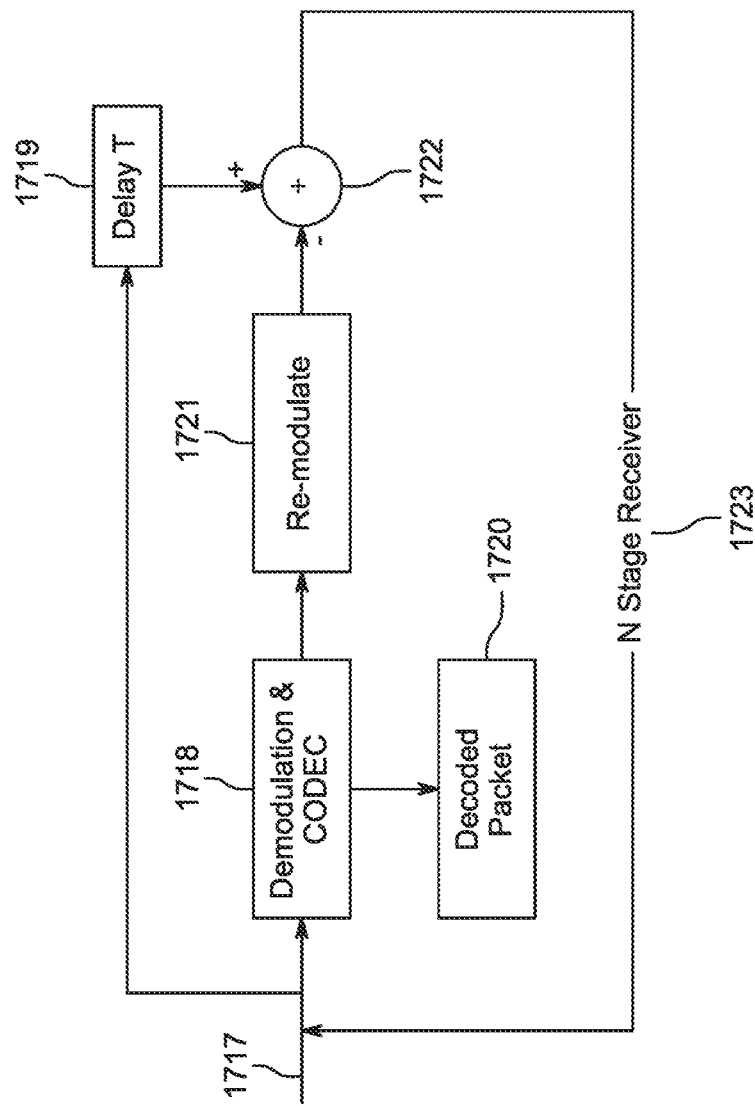
FIG. 17 is a diagram illustrating an example of N stage serial receiver architecture according to one or more embodiments.

FIG. 17 is a diagram of an example architecture of an N stage serial receiver. At the base station side, several MMSE receiver architectures may be implemented. A serial receiver architecture may be implemented as a chain of identically capable modules where each module may demodulate and decode the incoming packets, which may be ideally suited for the example of FIG. 16. For example, the WTRU transmission of 1617 may enter the receiver of the base station at 1717. The modules of the receiver may include a demodulation and CODEC module 1718, which may produce a decoded packet 1720, and/or may send an output to the re-modulation module 1721. At 1722 the remodulation may be combined 1722 with the delay time T 1719, which may go back to the start 1723 depending on the repeat N for a N stage receiver. The advantage of a serial receiver may be that the modules can also re-modulate the information and pass on to the subsequent serial stage for cancellation of the regenerated signal. This may be similar to successive interference cancellation (SIC) and the number of serial stages that are implemented here may be equivalent to the SIC stages.

In one situation, the base station may transmit a PDCCH CRC scrambled by RA-RNTI indicating the location of the RACH response. The RAR response that matches the chosen preamble identity may also contain the C-RNTI for the WTRU to be subsequently used for descrambling PDCCH.

In an alternative situation, orthogonal codes (for e.g., WH codes) may not be used as preambles. Instead, CAZAC sequences as used in LTE and NR may be preferred as RACH preambles. In such cases, the base station may advertise via system information several RACH parameters that may be transmitted in one or more system information blocks. The base station may broadcast a RACH root sequence index, RACH transmit opportunities, RACH transmission resources, data-part transmit opportunities, resources to be used for data-part, channelization codes (e.g., spreading codes) for the data-part, a modulation coding scheme (MCS) to apply for the data part and mapping between the RACH preamble index and data-part resources, data-part opportunities, and/or MCS and channelization codes.

For example, if a WTRU selected preamble index number 30 derived from a root index U, the base station may instruct the WTRU via the broadcasted system information which set of data-part opportunities, data-part resources, and/or MCS and channelization codes to choose. The data-part opportunities may exist on the same TTI as the preamble transmission opportunity or on TTIs immediately after the preamble transmission opportunity. The data-part resources may be sized appropriately to allow the WTRU to transmit one or more data-part fields previously mentioned. In one situation, the base station may require the WTRU to scramble the data-part instead of channelizing the data-part. In an alternative, the base station may require the WTRU to channelize as well as scramble the data-part. As discussed herein, the WTRU may transmit the preamble and data-part either on the same TTI or different TTIs but before receiving a RACH response (RAR).

Figure 18:
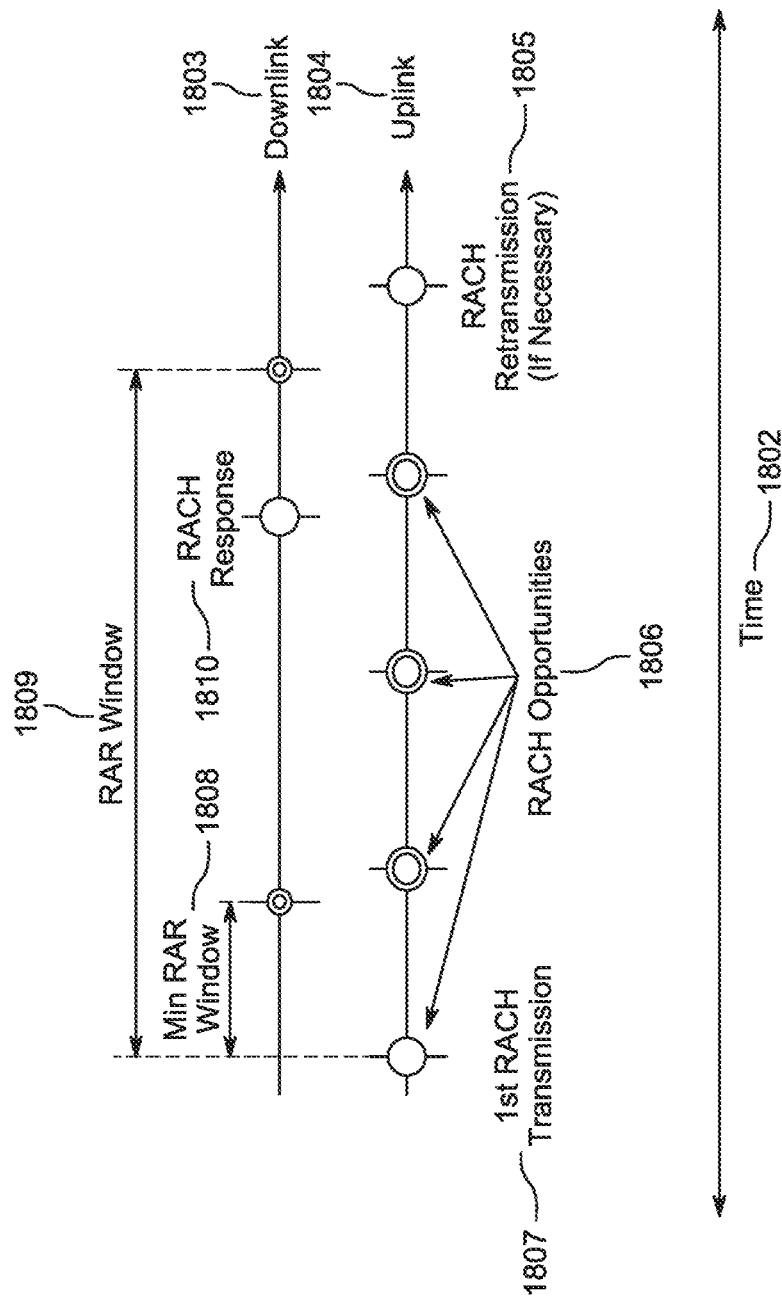
FIG. 18 is a diagram illustrating an example of RACH transmission and response windows according to one or more embodiments.

In some cases, there may be cascading RACH transmissions. FIG. 18 is a diagram that illustrates an example of a RACH timeline 1802 for a terrestrial network (e.g., LTE and NR). Here, a WTRU may transmit a first RACH message 1807 and wait for a RAR. The WTRU may transmit the RACH at one of a plurality of available RACH opportunities 1806. The WTRU may wait for a RACH response for a specific time-period identified by a RAR response window 1809. The RAR response window 1809 may be known at the WTRU via reading of the system information. If a RACH response 1810 arrives before the end of the RAR response window 1809, the WTRU may proceed to the next step of the RACH procedure such as decoding the RAR and transmitting RRC CONNECTION REQUEST at a subsequent transmission interval. If the WTRU does not receive a RACH response before the end of RAR window 1809 (e.g., RACH response 1810 is not received), the WTRU may re-transmit the RACH 1805 at a subsequent RACH opportunity following the end of the RAR window 1809. In the example shown in FIG. 18, there may be no additional RACH transmissions, following a 1$^{st}$ RACH transmission at a RACH opportunity, until the end of the corresponding RAR window 1809 even though further RACH opportunities 1806 could exist within the RAR window 1809. The WTRU may only need to retransmit a RACH 1805 if there is no RACH response for the previous RACH transmission within the RAR window 1809. The RAR window 1809 may be some time period, such as 10 ms long, and the minimum RAR window may be 1808.

Figure 19:
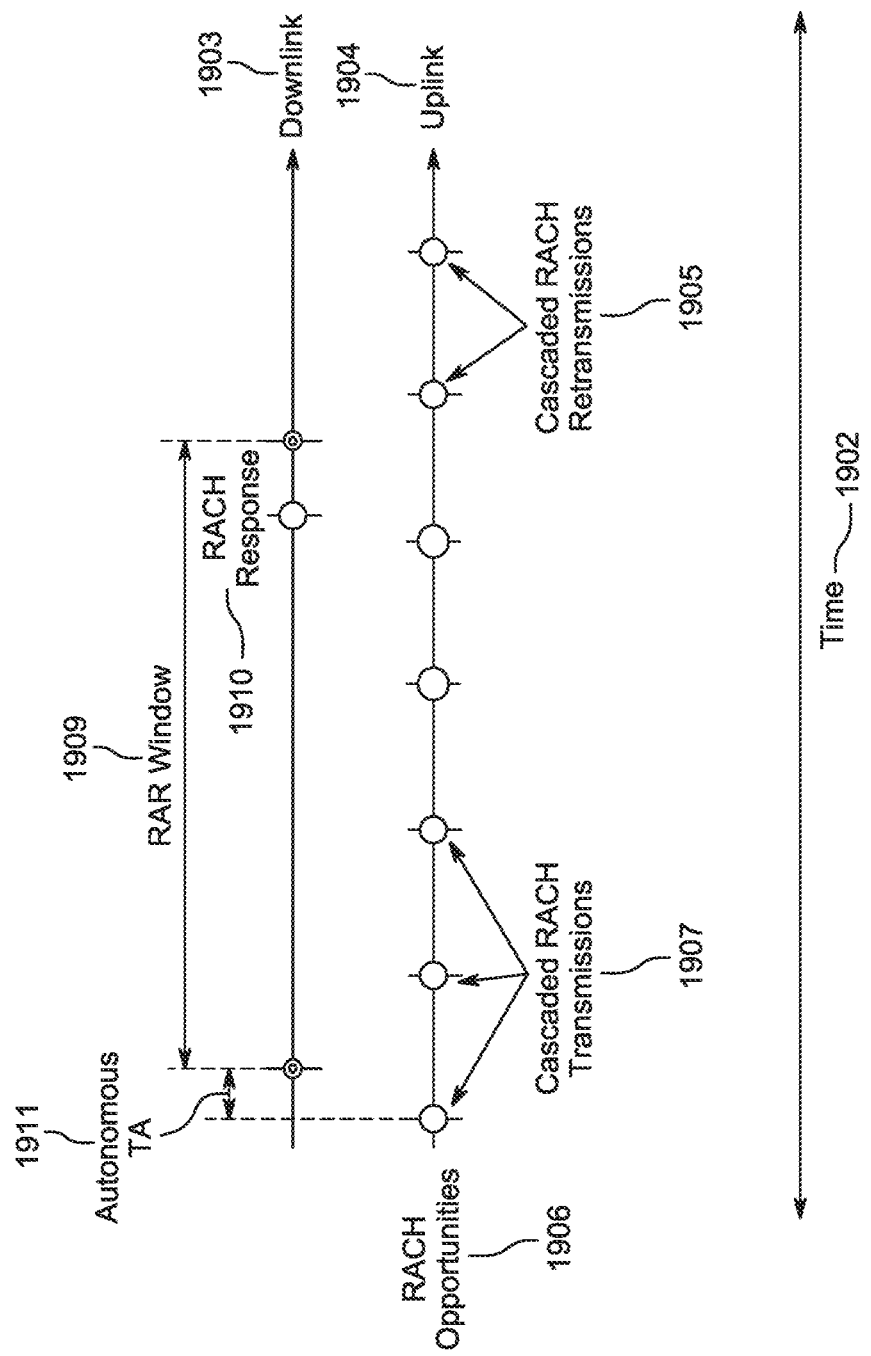
FIG. 19 is a diagram illustrating an example of cascaded RACH transmissions before a response according to one or more embodiments.

The mechanisms illustrated in the example of FIG. 18 works for a WTRU operating in a terrestrial network since the propagation times may be in microseconds and not perceivable. However, as discussed previously regarding NTNs, propagation latencies can be a few thousand times longer. FIG. 19 is a diagram that illustrates an example of RACH timeline for a NTN. The RAR window 1909 in the NTN system may need to be at least as long as $(2*T_{propagation\_delay}+T_{processing\_delay})$. Once a WTRU transmits a RACH to a NTN base station, the RACH response may take at least $((2*T_{propagation\_delay}+T_{processing\_delay})$ <RAR window) time units and if there is no RACH response, using the terrestrial methodology the WTRU may retransmit only at the end of the RAR window. The time penalty incurred here is more perceivable since even a single failed RACH attempt forces connection setup times to run into seconds.

To mitigate this possible issue, there may be a cascaded RACH procedure 1907. In the cascaded RACH procedure, the WTRU may transmit a configured amount of RACH messages, RACHCascadeCount, at specific opportunities of a plurality of RACH opportunities 1906 before waiting for a response. The RACHCascadeCount number of transmissions may be on consecutive RACH opportunities and/or may follow a pattern specified by RACHCascadePattern. The pattern may be either specified by a bitmap of 1s and 0s where a bit-1 represents availing RACH opportunity and a bit-0 represents skipping the RACH opportunity. Alternatively, the pattern may be a scalar value where each scalar value represents a pre-determined and agreed upon pattern sequence known a priori at the WTRU and the NTN. Both RACHCascadeCount and RACHCascadePattern may be signaled by the base station to the WTRUs over system information. Alternatively, the cascading RACH transmissions may be preconfigured at the WTRU in non-volatile RAM or in the USIM. As an example, in FIG. 19, RACHCascadeCount=3 and RACHCascadePattern='11100' signifying the WTRU transmitting RACH on three consecutive RACH opportunities 1907, which may be repeated at RACH transmission 1905 if the RACH response 1910 is not received on the downlink 1903.

In this approach, the WTRU may perform autonomous TA 1911 determination and advance its uplink transmission 1904 by the determined time units as shown in FIG. 19. The WTRU may transmit concurrent data and preamble as detailed herein. If the WTRU transmits data and preamble together on the same transmit interval, the WTRU may uniformly randomly select a different preamble at each RACH opportunity and perform the cascaded transmission or data+preamble as detailed herein. Alternatively, if the WTRU transmits only the preamble sequence, the WTRU may select the same preamble sequence as at a 1st RACH transmission and retransmit the same preamble sequence at each subsequent cascaded transmission.

The base station that receives the cascaded RACH transmissions processes each RACH individually. If the base station detects a conjoined data part and preamble part successfully and determines that the WTRU ID identified by the data part has previously been granted resources, the base station may ignore the RACH message. If the base station only receives the preamble part in a cascaded RACH attempt, it may continue to grant a nominal uplink grant for subsequently received cascaded RACH. The latency tolerable in the system versus wasted uplink nominal grants may be traded off as part of system design to arrive at an efficient RACH design. The WTRU that has received a RACH response during a cascaded RACH procedure may not attempt to decode any RACH response once contention is resolved.

Figure 20:
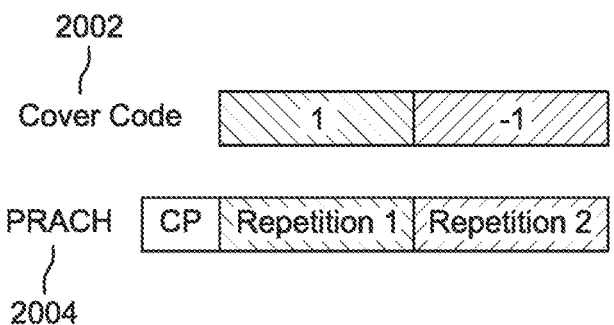
FIG. 20 is a diagram illustrating an example of using a cover code to implicitly indicate information about the timing offset that the WTRU uses in a PRACH transmission according to one or more embodiments.

In some cases, a WTRU may inform a gNB about the timing adjustment that is done by the WTRU during the transmission of the PRACH. This can may be done by implicitly signaling the timing offset of the PRACH transmission using a cover code over the PRACH sequence, or its repetitions. FIG. 20 is a diagram illustrating an example of using cover codes. In the example, the timing offset that the WTRU uses for transmission of a PRACH with two repetitions may be encoded (i.e., cover code 2002) as a sequence of 1 and −1 (i.e., indication of an integer multiple of a fixed value) which is multiplied by the subsections of the PRACH sequence 2004. The cover codes 2002 may implicitly indicate the information about the timing offset that the WTRU has used in PRACH transmission 2004: {1,−1} which may indicate a timing offset of 0.5 ms.

The WTRU may use a PRACH similar to PRACH Format 3 in LTE and NR (e.g., with a sequence of length 1.6 ms which is a twice repetition of the base sequence of length 839). The timing offset implemented by the WTRU in transmission of PRACH may be an integer multiple of 0.5 ms. In this case, four different cover codes of {1,1}, {1,−1}, {−1,1}, {−1,−1} may respectively indicate PRACH timing offsets of 0, 0.5 ms, 1 ms, 1.5 ms, respectively. Entries of this cover code may multiply the two repetitions of the base PRACH sequence in the PRACH Format 3. This example design may deal with variations in the RTT up to 1.5+0.684=2.184 ms.

Figure 21:
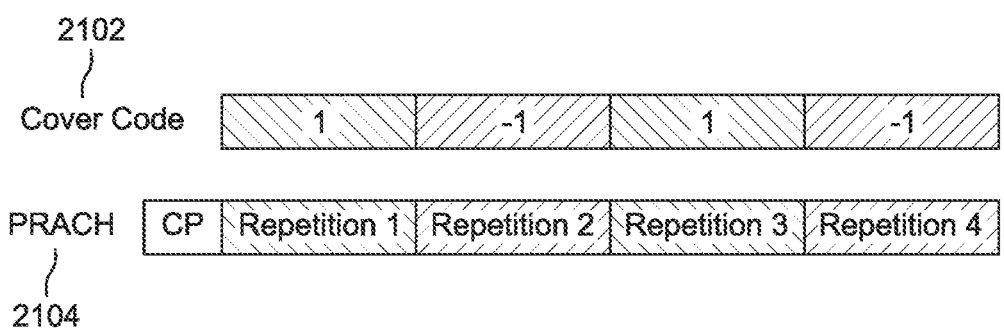
FIG. 21 is a diagram illustrating an example of using a cover code to implicitly indicate information about the timing offset that the WTRU uses in a PRACH transmission with four repetitions of a base PRACH sequence of size 839 according to one or more embodiments.

In the approach of using a cover code to indicate the PRACH timing offset may also be applied for longer PRACH sequences. FIG. 21. is a diagram that illustrates an example of cover codes for a long PRACH sequence. In many applications, to increase the coverage, it may be useful to have more repetitions of the base sequence. One example is using a PRACH format 2104 with four repetitions of a base PRACH sequence of size 839 and CP of length 0.684, as shown in FIG. 21. In one example, the cover code 2102 may have sixteen different possibilities which are all combinations of 1 and −1 which may indicate sixteen different values for the timing offset of the PRACH transmission. In another example, which may be better for coverage, the cover codes 2102 may be rows, or columns, of a 4 by 4 Hadamard matrix and may indicate four different values for the timing offset of the PRACH transmission.

Figure 22:
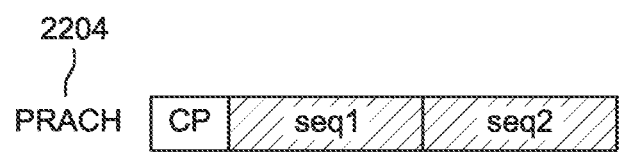
FIG. 22 is a diagram illustrating an example of an indication of a timing offset of a PRACH transmission by selecting a combination of available sequences of size 839 for construction of a PRACH preamble according to one or more embodiments.

FIG. 22. is a diagram illustrating an example where the timing offset of the PRACH transmission may be implicitly indicated by using different PRACH sequences (i.e., seq1, seq2) of size 839 inside the PRACH transmitted by a WTRU. In this way, two or more PRACH sequences may be assigned to a WTRU and the WTRU may indicate the value of timing offset of PRACH transmission by the selection of a sequence combination in the PRACH. As shown in the example of FIG. 22, if a PRACH with a structure similar to PRACH Format 3 is used and two PRACH sequences of size 839 are assigned to a WTRU, the WTRU may indicate 2×2=4 different values for the timing offset of the PRACH transmission by selecting two of them as seq1 and seq2 in transmission of its PRACH.

In terrestrial cellular systems (e.g., LTE and NR), the granularity of 0.52 μs may be considered as the base numerology μ of 15 kHz in order to enable the uplink transmission timing to be set with relatively good accuracy within the length of the uplink CP. In NR, there may be various use cases with different accuracy requirements. Accordingly, there is a need for techniques to adapt the TA granularity according to the service type as needed. For example, for Ultra Reliable Low-Latency Communications (URLLC), a significantly higher accuracy TA mechanism may be needed.

In a scenario where the granularity of the TA command for a given numerology u does not provide the required accuracy within the length of the CP, the WTRU may apply a finer TA granularity corresponding to a different numerology. In an example, the WTRU may determine the granularity of the TA implicitly according to the service (e.g., URLLC, eMBB, mMTC) rather than the configured numerology μ. For instance, for URLLC applications with 15 kHz subcarrier spacing (i.e., μ=0), the WTRU may use the TA corresponding to μ>0, using Table 5.

TABLE 5

TA as a function of Numerology

| Numerology (μ) | TA Granularity (μsec) |
|---|---|
| 0 | 0.52 |
| 1 | 0.26 |
| 2 | 0.13 |
| 3 | 0.06 |
| 4 | 0.03 |

In a scenario where different cell sizes have different propagation delays, the WTRU may have a different interpretation of the existing TA command. The WTRU may apply a coarser TA granularity corresponding to a different RTT. In an example, the WTRU may determine the granularity of the TA implicitly according to the type of the airborne (e.g., High Altitude UAS Platforms (HAPs)), or spaceborne (e.g., satellites (LEO, MEO, GEO)), vehicles for transmission. In this case, the higher the altitude, the larger the RTT and therefore the WTRU may select a coarser granularity for the TA. An example of this method with four RTT classes corresponding to four RTT ranges in terms of msec is shown in Table 6.

TABLE 6

TA as a function of the RTT class

| RTT (msec) | RTT Class | TA Granularity (μsec) |
|---|---|---|
| 2 | 0 | 0.52 |
| 50 | 1 | 13 |
| 180 | 2 | 46.8 |
| 600 | 3 | 156 |

The WTRU may determine the granularity of the TA according to the TA granularity indication which could be a 2 or 3-bit field transmitted in a downlink control channel (e.g., DCI), higher layer signaling (e.g., SIB), or medium access control (MAC) control element (CE). For example, three bits could be used to explicitly indicate μ from which the WTRU may derive the TA steps according to Table 5. Similarly, two bits may be used to explicitly indicate the RTT class from which the WTRU may derive the TA steps according to Table 6.

Figure 23:
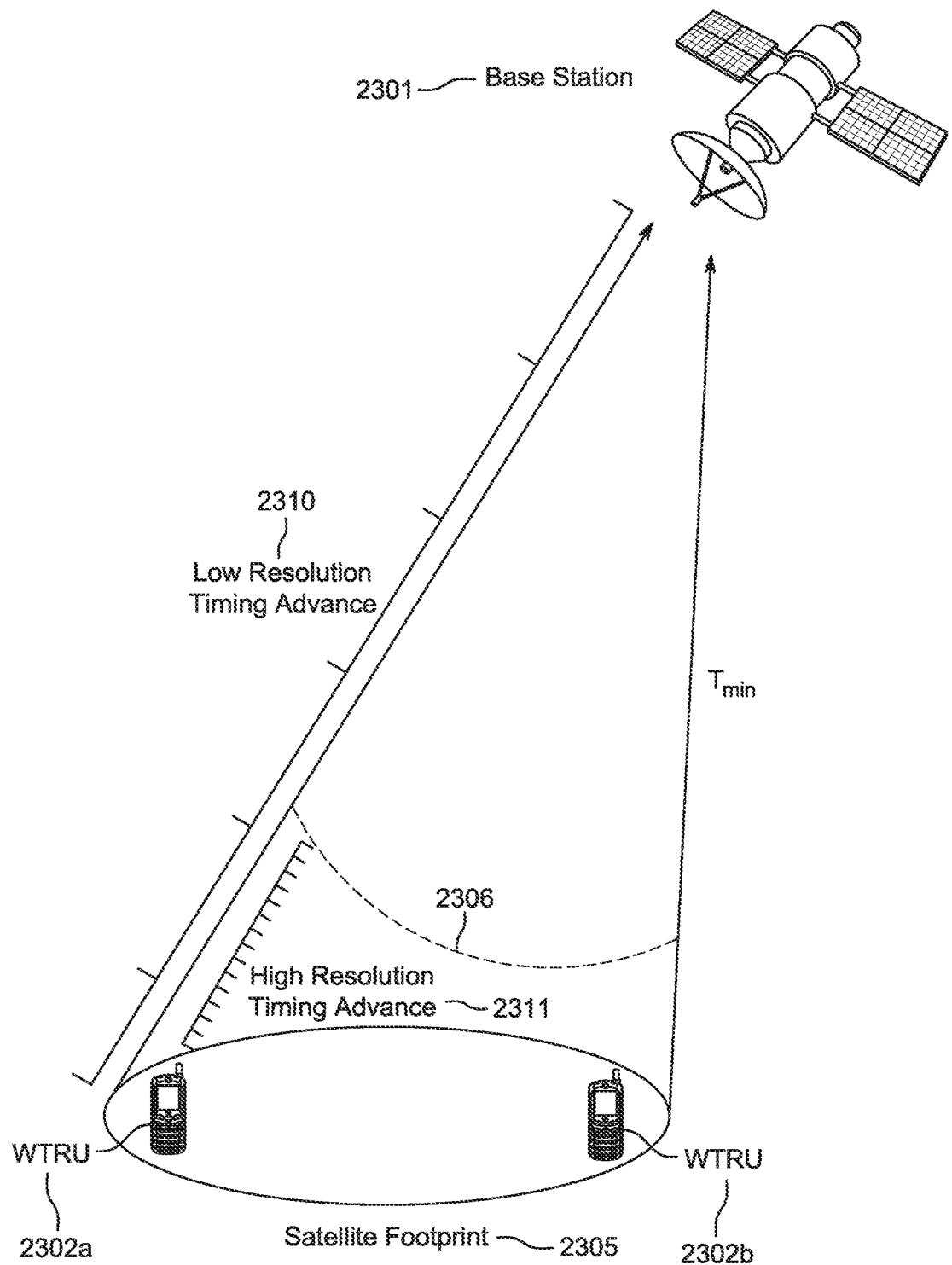
FIG. 23 is a diagram illustrating an example of a low-resolution timing advance and a high-resolution timing advance according to one or more embodiments.

FIG. 23 is a diagram that illustrates an example of having multiple TA granularities. A WTRU (e.g., 2302a or 2302b) may receive, from a base station on a satellite 2301, a TA command carrying a two-part bitfield each part associated with a different granularity such as a high-resolution (HR) part 2311 and a low-resolution (LR) part 2310. Note, that FIG. 23 may be similar to FIG. 4 in the distances/times associated with satellite 2301 to the ground, such as the minimum RTT being the $T_{min}$ multiplied by 2.

The LR 2310 part may provide larger granularity in time for setting the TA. The HR 2311 part may provide finer granularity. Unlike terrestrial networks, where the distance between a gNB and a WTRU could be very small, in NTNs there may be a minimum distance between the gNB 2301 and a WTRU 2302a/b. This minimum distance may be much larger than the cell size or the beam footprint size 2305. Therefore the dynamic range of the TA value may be less than its maximum value. As shown in FIG. 23, the granularity of the LR 2310 part may be chosen in such a way that it may reach the maximum range of the propagation delay. On the other hand the granularity of the HR 2311 part may be chosen in such a way that it may cover the dynamic range of the propagation delay.

The granularity of the LR part may be equal or greater than the maximum TA supported by the terrestrial networks and the granularity of the HR part may be much smaller than the maximum TA supported by the terrestrial networks. The WTRU may calculate the actual TA by combining the HR and LR parts of the two-part bitfield of the TA command and their associated granularity values.

Figure 24:
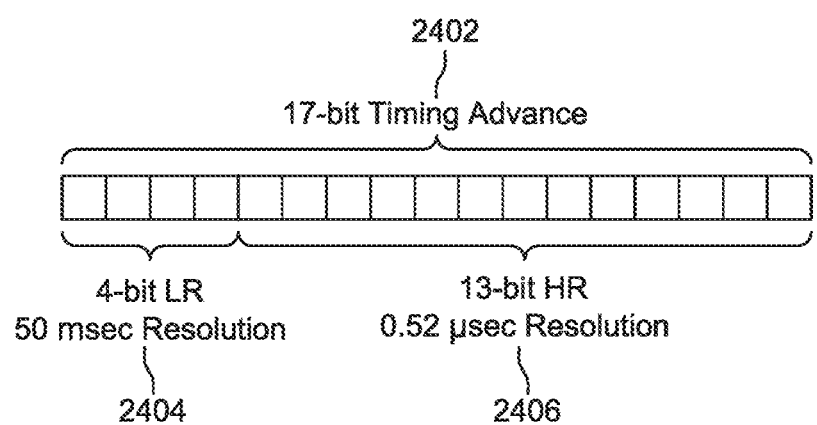
FIG. 24 is a diagram illustrating an example 17-bit timing advance bitfield comprising of a 4-bit low-resolution part and a 13-bit high-resolution part according to one or more embodiments.

FIG. 24 is a diagram that illustrates an example 17-bit TA bitfield comprising of a 4-bit LR part and a 13-bit HR part. The LR part may be defined as a multiple integer of the maximum timing alignment of $\tau_{LR}$=50 msec 2406, which may be the maximum RTT associated with a LEO satellite. Therefore, the LR part of the TA command may carry four bits that indicate an index value $T_A^{LR}$=0, 1, 2, . . . , 12, which may be used by the WTRU to control the amount of LR timing adjustment as multiples of 50 msec. With this approach a RTT of up to 600 ms for subcarrier spacing of 15 kHz may be supported which may be a high estimate of expected RTT for NTNs.

The HR part of the TA may be defined as a multiple integer of 0.52 μsec similar to the one defined in NR for terrestrial networks with 15 kHz subcarrier spacing. In a more general form, the HR part of the TA command may indicate the change of the uplink timing relative to the current uplink timing as multiples of $16.64 \cdot T_c/2^\mu$ for any given numerology of μ. The WTRU may determine the granularity of the HR part of TA for various numerologies according to Table 7.

TABLE 7

| High-resolution TA granularity | |
|---|---|
| μ | $T_{HR}$ (μsec) |
| 0 | 0.52 |
| 1 | 0.26 |
| 2 | 0.13 |
| 3 | 0.06 |
| 4 | 0.03 |

The HR part of the TA command may carry thirteen bits that may indicate an index value THR=0, 1, 2, . . . , 7692, which may be used by the WTRU to control the amount of high-resolution timing adjustment as multiples of 0.52 usec 2406, for subcarrier spacing of 15 kHz up to 4 msec which corresponds to an RTT variation of a satellite beam footprint of up to 600 Km radius.

Figure 25:
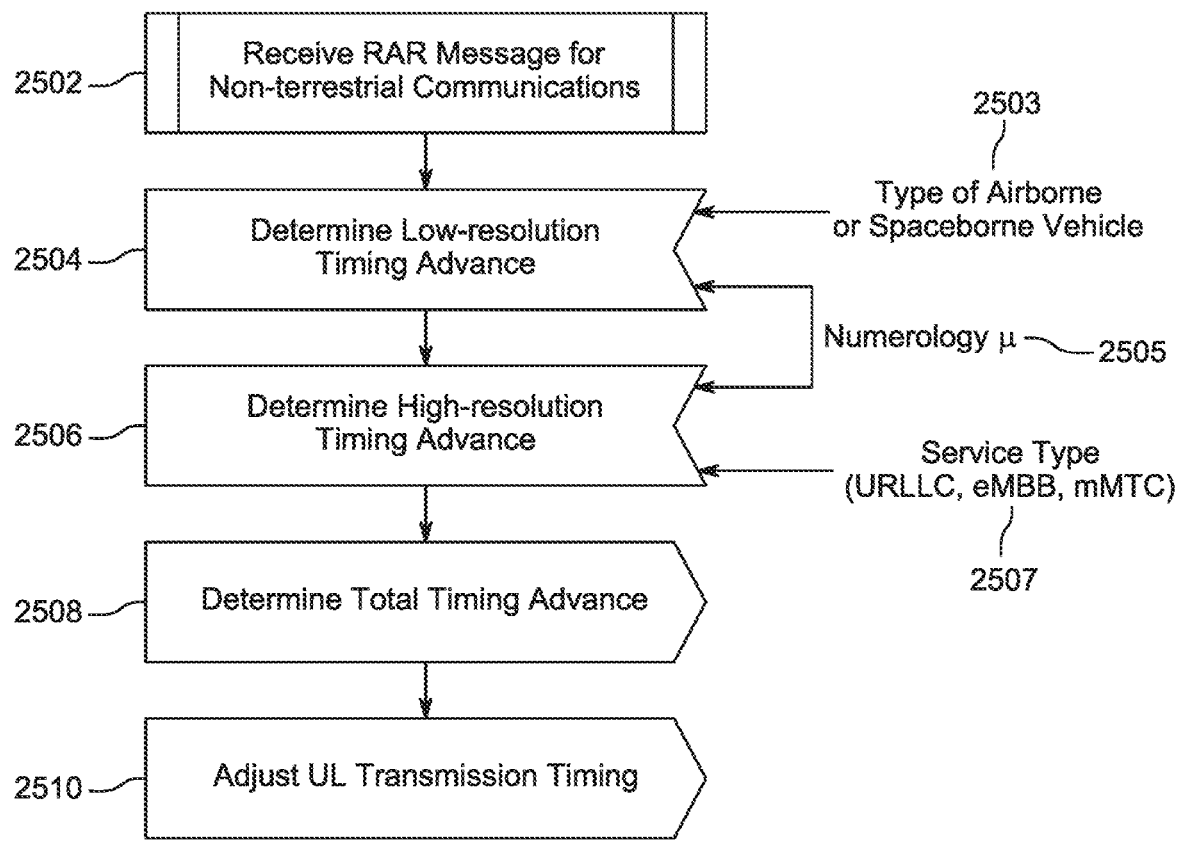
FIG. 25 is a diagram illustrating an example WTRU procedure for a multiple-resolution timing advance determination for non-terrestrial communications according to one or more embodiments.

FIG. 25 is a flowchart illustrating an example procedure performed by a WTRU for the multiple-resolution TA determination for NTN communication. At 2503, a WTRU may receive a RAR message for NTN. Based on the information regarding the type of airborne or spaceborne vehicle 2503, the WTRU at 2504 may determine a LR TA. Based on the service type (e.g., URLLC, eMBB, mMTC) 2507, the WTRU at 2506 may determine a HR TA. For the both the LR and HR components, the numerology u May 2505 may also be considered. At 2508 the WTRU may determine the total TA, τ, by adding the LR and HR parts of the TA and then adjust the timing of its uplink transmission according to: $\tau = T_A^{LR} \cdot \tau_{LR} + T_A^{HR} \cdot \tau_{HR}$. At 2510 the WTRU may adjust the uplink timing based on the determined total TA.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a satellite, WTRU, UE, terminal, base station, RNC, or any host computing device.

What is claimed:

1. A method performed by a wireless transmit and receive unit (WTRU), the method comprising:
   receiving, from a spaceborne satellite, system information that includes a position of, and trajectory parameters about, the spaceborne satellite;
   determining a position of the WTRU using a global navigation satellite system (GNSS);
   determining a timing advance (TA) based on the determined WTRU position and the system information wherein the determined TA provides for compensation for a round trip time (RTT) between the WTRU and the spaceborne satellite; and
   transmitting a signal using the TA.

2. The method of claim 1, wherein the system information indicates one or more physical-random-access-channel (PRACH) resources.

3. The method of claim 2, further comprising:
   receiving a random-access response (RAR)
   wherein the RAR includes a TA command;
   determining an adjusted TA based on the TA command and the estimated propagation delay; and
   transmitting a message using the adjusted TA.

4. The method of claim 3, wherein the RAR further includes at least one of a power correction, an uplink grant, or a temporary identifier.

5. The method of claim 3, wherein the RAR includes a two-part bitfield, wherein a first part of the two-part bitfield has a high-resolution TA and a second part of the two-part bitfield has a low-resolution TA.

6. The method of claim 1, wherein the transmitting the signal occurs at a random-access-channel (RACH) opportunity indicated in the system information.

7. A wireless transmit-and-receive unit (WTRU), the WTRU comprising:
   a processor; and
   a transceiver, wherein the processor and transceiver are configured to:
      receive, from a spaceborne satellite, system information that includes a position of, and trajectory parameters about, the spaceborne satellite;
      determine a position of the WTRU using a global navigation satellite system (GNSS);
      determine a timing advance (TA) based on the determined position of the WTRU and the system information wherein the determined TA provides for compensation for a round trip time (RTT) between the WTRU and the spaceborne satellite; and transmit a signal using the TA.

8. The WTRU of claim 7, wherein the system information indicates one or more physical-random-access-channel (PRACH) resources.

9. The WTRU of claim 8, wherein the processor and transceiver are further configured to:

receive a random-access response (RAR), wherein the RAR includes a TA command;

determine an adjusted TA based on the TA command and the estimated propagation delay; and transmit a message using the adjusted TA.

10. The WTRU of claim 9, wherein the RAR further includes at least one of a power correction, an uplink grant, or a temporary identifier.

11. The WTRU of claim 9, wherein the RAR includes a two-part bitfield, wherein a first part of the two-part bitfield has a high-resolution TA and a second part of the two-part bitfield has a low-resolution TA.

12. The WTRU of claim 7, wherein the processor and transceiver are further configured to transmit the signal at a random-access-channel (RACH) opportunity indicated in the system information.

\* \* \* \* \*